United States Patent
Choi et al.

(10) Patent No.: US 8,055,361 B2
(45) Date of Patent: Nov. 8, 2011

(54) MEMORY EXPANSION PACK FOR PROVIDING CONTENT TO PORTABLE TERMINAL

(75) Inventors: Jin-Sub Choi, Daegu (KR); Yung-Gu Kang, Gumi-si (KR); Yun-Hyang Kim, Gumi-si (KR); Mi-Kyung Han, Gumi-si (KR); Yeong-Moo Ryu, Gumi-si (KR); Soon-Jin Kim, Daegu (KR); Hark-Sang Kim, Daegu (KR); Tae-Moon Roh, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1195 days.

(21) Appl. No.: 10/985,900

(22) Filed: Nov. 12, 2004

(65) Prior Publication Data
US 2005/0108462 A1    May 19, 2005

(30) Foreign Application Priority Data

Nov. 13, 2003    (KR) .................. 10-2003-0080341
Mar. 31, 2004    (KR) .................. 10-2004-0022095
Jun. 18, 2004    (KR) .................. 10-2004-0045599

(51) Int. Cl.
*G06F 17/00* (2006.01)
(52) U.S. Cl. .................................................. 700/94
(58) Field of Classification Search .................. None
See application file for complete search history.

(56) References Cited

U.S. PATENT DOCUMENTS

| | | | | |
|---|---|---|---|---|
| 6,718,182 B1 * | 4/2004 | Kung | ................... | 455/556.1 |
| 7,103,381 B1 * | 9/2006 | Wright et al. | ........... | 455/557 |
| 7,123,936 B1 * | 10/2006 | Rydbeck et al. | ........... | 455/557 |
| 2001/0021663 A1 * | 9/2001 | Sawada et al. | ........... | 455/572 |
| 2002/0147035 A1 * | 10/2002 | Su | ................... | 455/572 |

* cited by examiner

*Primary Examiner* — Walter F Briney, III
(74) *Attorney, Agent, or Firm* — Roylance, Abrams, Berdo and Goodman, LLP

(57) ABSTRACT

A memory expansion pack, which includes a memory for storing content, an FM receiver, an ear jack, and a controller, is connected with a portable terminal through a connector of the pack to provide content to the terminal. Under the control of the controller, content stored in the memory and audio data, which is received through the FM receiver from an external device over a set frequency channel, is transmitted to the terminal. When the ear jack is connected with the external output device, it outputs the content through the external output device. When the ear jack is connected with a device, such as a PC, the ear jack downloads content from the PC. The memory expansion pack allows the user to provide and use a large amount of various content. The pack can also provide high quality services, overcoming the limited memory capacity of portable terminals, and reduce the cost of wireless data communication.

9 Claims, 10 Drawing Sheets

MEMORY EXPANSION PACK FOR PROVIDING CONTENT TO PORTABLE TERMINAL

CROSS-REFERENCE TO RELATED APPLICATIONS

This application claims the benefit under 35 U.S.C. §19(a) of Korean Patent Application No. 2003-80341 entitled "MEMORY EXPANSION PACK FOR PROVIDING CONTENT TO PORTABLE TERMINAL", filed in the Korean Intellectual Property Office on Nov. 13, 2003, of Korean Patent Application No. 2004-22095 entitled "MEMORY EXPANSION PACK FOR PROVIDING CONTENT TO PORTABLE TERMINAL", filed in the Korean Intellectual Property Office on Mar. 31, 2004, and of Korean Patent Application No. 2004-45599, filed in the Korean Intellectual Property Office on Jun. 18, 2004, the entire contents of each of which are incorporated herein by reference.

BACKGROUND OF THE INVENTION

1. Field of the Invention

The present invention relates to a memory expansion pack for storing content. More particularly, the present invention relates to an apparatus and method for providing content, stored in a memory expansion pack, to a portable terminal connected with the expansion pack.

2. Description of the Related Art

Portable terminals have rapidly spread and are widely used by the general public. Hybrid portable terminals with various functions, as well as simple telephone functions, have been developed to meet various needs and desires of consumers. The supply chain for various and dynamic content has also been visualized along with the opening of the wireless network, the rapid evolution of the wireless network, and the increased spread of advanced mobile terminals. Accordingly, memory and data communication fees have become primary issues for users and service providers, due to the growing demand for such large-volume content in a changing environment.

In particular, one example includes the portable terminal with an MP3 playback function, which was previously available only to MP3 players, and which is now on the market. This device allows the user to easily listen to music using the portable terminal which is always in their possession. To listen to MP3-encoded music using the portable terminal, however, the user must store downloaded MP3 files in a memory in the portable terminal. Most MP3 files are about 4 MB in size, and a general memory for portable terminals can only store a limited number of such MP3 files, typically, 4 or 5 MP3 files.

Accordingly, a need exists for an apparatus and method for providing a large amount of content in various ways to a portable terminal.

SUMMARY OF THE INVENTION

Therefore, the present invention has been made in view of the above and other problems, and it is an object of the present invention to provide an apparatus and method for providing a large amount of content in various ways to a portable terminal using a memory expansion pack in which the content is stored.

In accordance with one aspect of the present invention, the above and other objects can be accomplished by the provision of a memory expansion pack for providing content to a portable terminal, the expansion pack comprising a memory for storing content, an FM (Frequency Modulation) receiver for receiving audio data from an external device over a set frequency channel, a controller for controlling operation of the memory expansion pack and for performing control operations for transmitting the content stored in the memory and the audio data received through the FM receiver to the portable terminal, an ear jack for outputting the content through an external output device when the ear jack is connected with the external output device and for downloading content from a personal computer when the ear jack is connected with the personal computer, and a connector for connection with the portable terminal.

In accordance with another aspect of the present invention, there is provided a memory expansion pack for providing content to a portable terminal, the expansion pack comprising an FM receiver for receiving audio data from an external device over a set frequency channel, a memory for storing MP3 (MPEG Audio Layer-3) file data, recorded voice data, and the audio data received through the FM receiver, an ear jack for outputting data through an external output device when the ear jack is connected with the external output device and for downloading data from a personal computer when the ear jack is connected with the personal computer, and a connector for connection with the portable terminal.

In accordance with still another aspect of the present invention, there is provided a memory expansion pack for providing content to a portable terminal, the expansion pack comprising an FM receiver for receiving audio data from an external device over a set frequency channel, a memory for storing MP3 (MPEG Audio Layer-3) file data, recorded voice data, and the audio data received through the FM receiver, a decoder/encoder for decoding data stored in the memory and for encoding data output from a converter, wherein the converter is provided for converting an analog signal of input data into a digital signal and for converting a digital signal of data output from the decoder/encoder into an analog signal, an ear jack for outputting data through an external output device when the ear jack is connected with the external output device and for downloading data from a personal computer when the ear jack is connected with the personal computer, and a connector for connection with the portable terminal.

In accordance with yet another aspect of the present invention, there is provided a method for providing various content in a portable terminal connected with a memory expansion pack, the method comprising switching to an MP3 (MPEG Audio Layer-3) mode when the portable terminal is connected with the memory expansion pack, displaying a list of MP3 files stored in a memory in the memory expansion pack when a user of the portable terminal selects the memory in the memory expansion pack in the MP3 mode, and playing an MP3 file selected from the displayed MP3 file list according to user selection information.

BRIEF DESCRIPTION OF THE DRAWINGS

The above and other objects, features and other advantages of the present invention will be more clearly understood from the following detailed description taken in conjunction with the accompanying drawings, in which.

Throughout the drawings, like reference numerals will be understood to refer to like parts, components and structures.

DETAILED DESCRIPTION OF THE EXEMPLARY EMBODIMENTS

Figure 1:
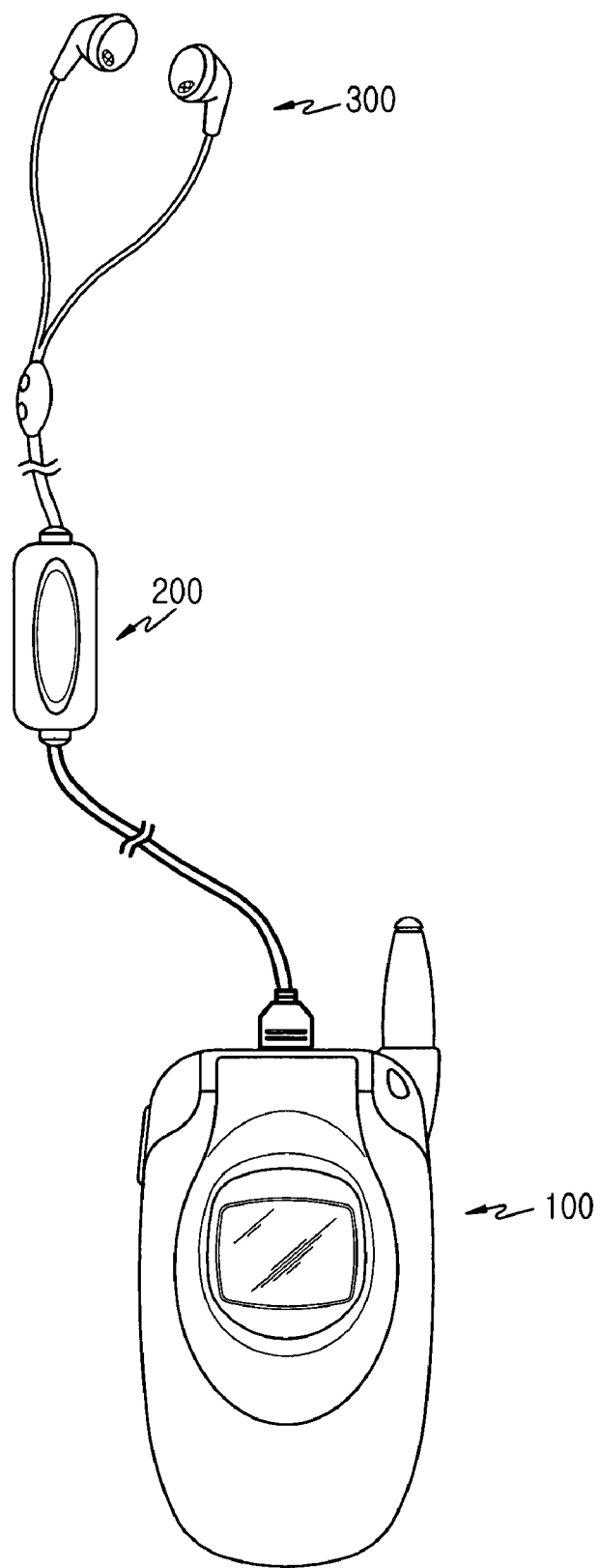
FIG. 1 illustrates a portable terminal that is connected with a memory expansion pack through a connector according to an embodiment of the present invention.

Now, exemplary embodiments of the present invention will be described in detail with reference to the annexed drawings. In the drawings, the same or similar elements are denoted by the same reference numerals, even though they are depicted in different drawings.

FIG. 1 illustrates a portable terminal that is connected with a memory expansion pack through a connector according to an embodiment of the present invention.

In FIG. 1, a memory expansion pack 200 includes a memory for storing content, a controller for controlling content stored in the memory, an ear jack for connection with an earphone or a personal computer for outputting or downloading the content, and a connector that is connected with the portable terminal 100 for providing content to the portable terminal 100.

The connector may include a connection line or a plug. That is, the memory expansion pack 200 may be connected with the portable terminal 100 through the connection line as shown in FIG. 1 or through a plug. The connector may also be connected with an external output device connected with the portable terminal 100.

The memory in the memory expansion pack 200 may include an embedded expansion memory, a detachable expansion memory, or both. Content in the portable terminal 100 can be backed up in the memory, and various content downloaded from the personal computer can be stored in the memory. The various stored content, such as MP3 files, moving images, language-learning material/dictionaries (for example, foreign language conversation-learning materials and English-to-Korean and Korean-to-English dictionaries), cartoons/games (for example, PRG, strategy simulation games, and avatars), geographical information services (for example, a traffic information service and a location determination service), can be sorted by content type and stored in the memory. The memory expansion pack 200 when configured as described above, can then be connected with a serial terminal of the portable terminal 100 to provide various content to the portable terminal 100.

If an MP3 file is provided to the portable terminal 100 through the memory expansion pack 200, the MP3 file is output through an earphone 300 or an external speaker (not shown), which is an external output device connected with the memory expansion pack 200, or through a speaker of the portable terminal 100 under the control of the portable terminal 100.

FIGS. 2 through 6 illustrate a portable terminal 100 connected with a memory expansion pack 200 according to embodiments of the present invention, and are described in the exemplary case when the memory expansion pack 200 provides MP3 content to the portable terminal 100.

A detailed description will now be given of how an MP3 file in the memory expansion pack 200 is provided to the portable terminal 100 and is then output through an external output device, with reference to FIGS. 2 through 6.

Figure 2:
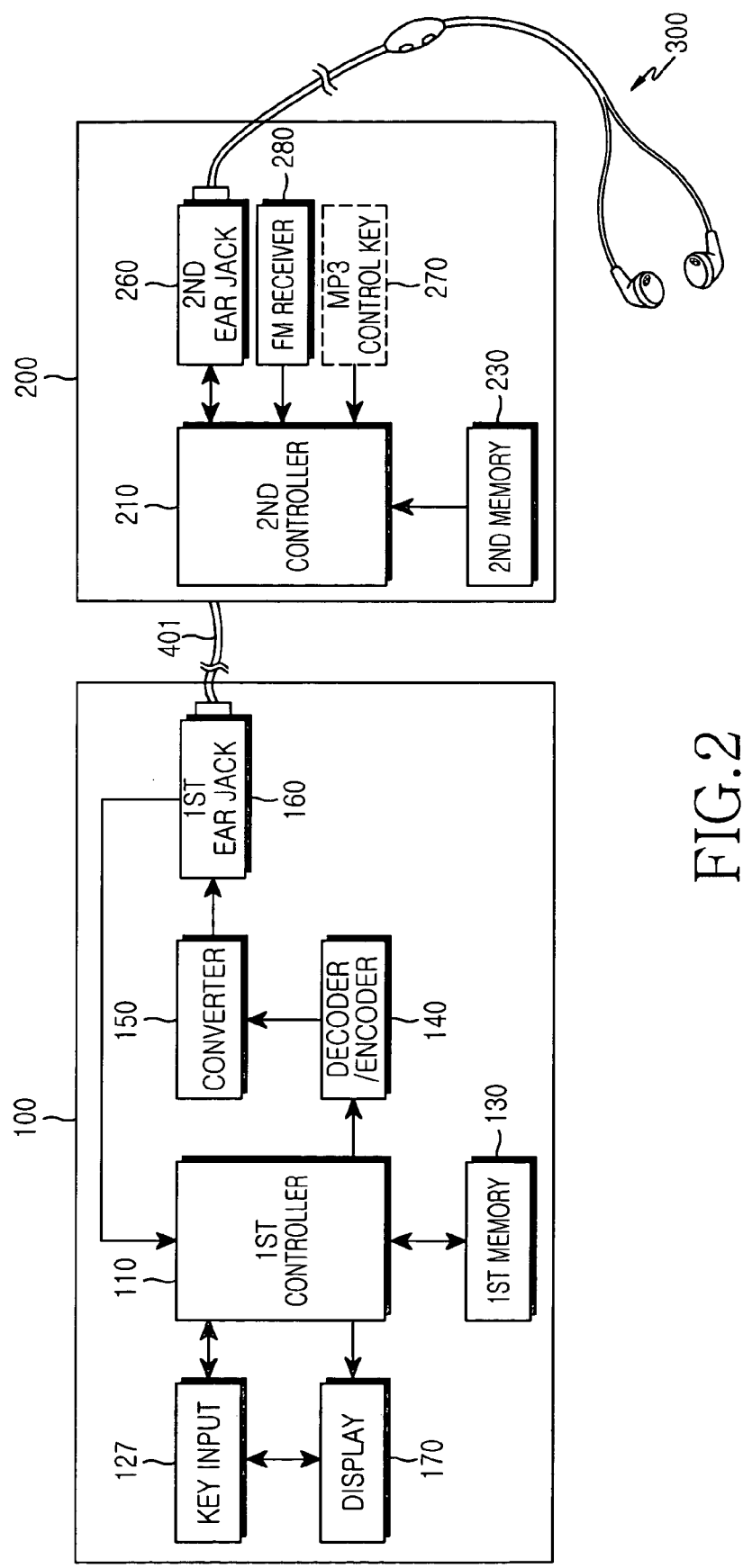
FIG. 2 is a block diagram illustrating the configuration of a memory expansion pack which is connected with a portable terminal according to a first embodiment of the present invention.

FIG. 2 is a block diagram illustrating the configuration of a memory expansion pack which is connected with a portable terminal according to a first embodiment of the present invention. The first embodiment will be described with reference to FIG. 2 under the assumption that the memory expansion pack is connected with the portable terminal through a connection line of the memory expansion pack, and wherein an earphone, which is an external output device, is inserted in the memory expansion pack to output audio signals.

As shown in FIG. 2, the portable terminal 100 includes a first controller 110, a key input unit 127, a first memory 130, a decoder/encoder 140, a converter 150, a first ear jack 160, and a display unit 170. The memory expansion pack 200 includes a second controller 210, a second memory 230, a second ear jack 260, and an FM receiver 280.

The first controller 110 in the portable terminal 100 controls the overall operations of the portable terminal 100 in accordance with a first embodiment of the present invention. The first controller 110 performs a control operation to read an MP3 file stored in the second memory 230 in the memory expansion pack 200, and output the read MP3 file to the decoder/encoder 140.

The first controller 110 also performs a control operation to selectively modify, add and delete MP3 files stored in the second memory 230 in the memory expansion pack 200, and also to allow MP3 files stored in the second memory 230 in the memory expansion pack 200 to be stored in the first memory 130 in the portable terminal 100. The first controller 110 also performs a control operation to allow playback, rewind/fast-forward, stop/pause, volume-control, etc., of MP3 files stored in the second memory 230 according to key inputs of an MP3 control key provided on the key input unit 127. The MP3 control key enables the user to perform playback, rewind/fast-forward, stop/pause, volume-control, etc., of MP3 files.

The first controller 110 may also perform a control operation for transmitting MP3 files stored in the second memory 230 in the memory expansion pack 200 to a specific recipient.

If a call occurs during the output of an MP3 file (i.e., during the output of an audio signal thereof), the first controller 110 controls the second controller 210 in the memory expansion pack 200 to temporarily stop the output of the MP3 file and inform the user of the call occurrence.

The first controller 110 may also perform a control operation for outputting audio data received through the FM receiver 280 in the memory expansion pack 200 in FM reception mode, and a control operation for encoding the audio data received through the FM receiver 280 via the decoder/encoder 140 and storing the encoded audio data in the first memory 130 or in the second memory 230 of the memory expansion pack 200.

The first controller 110 may still also perform a control operation for encoding audio data input in recording mode via the decoder/encoder 140 and storing the encoded audio data in the first memory 130 or in the second memory 230 of the memory expansion pack 200.

The decoder/encoder 140 decodes an MP3 file output from the first controller 110, and the converter 150 converts a digital audio signal of the decoded MP3 file into an analog audio signal, and outputs the analog audio signal to the first ear jack 160.

Under the control of the first controller 110, the converter 150 converts an analog signal of audio data received in FM reception mode or recording mode into a digital audio signal, and the decoder/encoder 140 encodes the digital audio signal of the received audio data and stores the encoded signal in the first memory 130 or in the second memory 230 of the memory expansion pack 200.

The first ear jack 160 is connected with a connection line 401 of the memory expansion pack 200 to transfer a digital signal of an MP3 file output from the memory expansion pack 200 to the first controller 110, and transfer an analog signal of an MP3 file output from the converter 150 to the memory expansion pack 200.

The first ear jack 160 transfers audio data, which is output through the FM receiver 280 in the memory expansion pack 200 in FM reception mode, to the first controller 110, and transfers an analog signal of audio data output from the converter 150 to the memory expansion pack 200. The first ear jack 160 also transfers audio data, which is input through a microphone (not shown) provided in the memory expansion pack 200 or in the earphone 300 in recording mode, to the first controller 110.

The first memory 130 may be comprised of program and data memories. The program memory can store programs for controlling general operations of the portable terminal and programs for controlling MP3 files provided from the memory expansion pack 200 connected with the portable terminal. The data memory temporarily stores data items generated during execution of the programs. The first memory 130 can download and store MP3 files stored in the second memory 230 in the memory expansion pack 200.

The first memory 130 can store audio data input in recording mode. The first memory 130 can also store audio data received in FM reception mode.

The display unit 170 displays user data output from the first controller 110. The display unit 170 may include a Liquid Crystal Display (LCD). In this case, the display unit 170 may be comprised of an LCD controller, a memory capable of storing image data, and an LCD panel. If the LCD is embodied as a touch screen, then the display unit 170 can also operate as an input unit. The display unit 170 can display information of MP3 files (for example, a list of MP3 files) stored in the second memory 230 in the memory expansion pack 200.

The key input unit 127 includes keys for inputting number and character information, and function keys for setting various functions. The key input unit 127 may also include an MP3 file control key.

The second controller 210 in the memory expansion pack 200 performs control operations in accordance with a first embodiment of the present invention, such as a control operation for transmitting a digital audio signal of an MP3 file stored in the second memory 230 to the first controller 110 in the portable terminal 100 through the connection line 401, and outputting an analog audio signal of the MP3 file received from the first controller 110 through an earphone 300 connected with the second ear jack 260. If a personal computer (not shown) is connected with the memory expansion pack 200 through the second ear jack 260, the second controller 210 performs a control operation for allowing the second memory 230 to store an MP3 file downloaded from the personal computer. If a call occurs during the output of an MP3 file, the second controller 210 performs a control operation for temporarily stopping the output of the MP3 file and informing the user of the call occurrence under the control of the first controller 110.

The second controller 210 performs a control operation for transmitting audio data, which is received through the FM receiver 280 in FM reception mode, to the first controller 110 in the portable terminal 100, and storing the audio data encoded by the portable terminal 100 in the second memory 230 when the encoded audio data is received from the portable terminal 100.

The second controller 210 also performs a control operation for transmitting audio data, which is received through the microphone provided in the memory expansion pack 200 or in the earphone 300 in recording mode, to the portable terminal 100, and storing the audio data encoded by the portable terminal 100 in the second memory 230 when the encoded audio data is received from the portable terminal 100.

The second memory 230 stores MP3 files containing digital audio signals. The second memory 230 can store audio data input in recording mode and store audio data received in FM reception mode.

If the second ear jack 260 is connected with an earphone 300, the second ear jack 260 outputs the MP3 files and audio data, which is received through the FM receiver 280, through the earphone 300. If the second ear jack 260 is connected with a personal computer, the second ear jack 260 transfers an MP3 file downloaded from the personal computer to the second controller 210.

An MP3 control key 270 may be provided on the memory expansion pack 200 and may also be provided on the earphone 300 to control the MP3 file. The memory expansion pack 200 may also include a microphone for inputting a speech signal in communication mode.

The FM receiver 280 can receive a frequency-modulated audio signal from an external device over a specific frequency channel as set by the user. For example, the specific frequency channel can be selected from frequencies in the range of 88.1 to 108 MHz which are not in use for public broadcasting. Here, to listen to the audio signal received from the external device using the portable terminal 100, the user preferably sets the FM receiver 280 to the same FM radio frequency as the specific frequency channel from the external device.

With reference to FIG. 2, a description will now be given of how the portable terminal 100 outputs an MP3 file using the memory expansion pack 200 according to a first embodiment of the present invention.

If the connection line 401 of the memory expansion pack 200 is connected with the first ear jack 160 of the portable terminal 100 as shown in FIG. 2, the first controller 110 detects this connection and switches the operating mode of the portable terminal 100 to MP3 mode. If the user of the portable terminal selects the second memory 230 of the memory expansion pack 200 in MP3 mode, the first controller 110 detects this selection and displays a list of MP3 files stored in the second memory 230 on the display unit 170. When the user selects playback of an MP3 file from the MP3 file list displayed on the display unit 170, the second controller 210 transmits a digital signal of the selected MP3 file stored in the second memory 230 to the first controller 110.

The first controller 110 converts the digital signal of the MP3 file into an analog signal through the decoder/encoder 140 and the converter 150, and transfers the analog signal to the second controller 210. The second controller 210 then outputs the analog signal of the MP3 file through the earphone 300 connected to the second ear jack 260.

If audio data is received through the FM receiver 280 in the memory expansion pack 200 in FM reception mode, the audio data is transmitted to the portable terminal 100, and is then converted into an analog signal in the portable terminal 100. After being transmitted back to the memory expansion pack 200, the analog signal of the audio data is output through the earphone 300 inserted in the second ear jack 260.

If a storage function is selected based on user input information (for example, key inputs) in FM reception mode, audio data received through the FM receiver 280 is converted into a digital signal through the converter 150 in the portable terminal 100. After being encoded through the decoder/encoder 140, the digital signal of the received audio data is stored in the first and second memories 130 and 230.

If audio data is input through a microphone (not shown) provided in the earphone 300 connected with the memory expansion pack 200 or a microphone (not shown) in the portable terminal 100, the audio data is converted into a digital signal through the converter 150 in the portable terminal 100. After being encoded through the decoder/encoder 140, the digital signal of the received audio data is stored in the first and second memories 130 and 230.

Although a first embodiment of the present invention has been described under the assumption that the earphone 300 is inserted in the second ear jack 260 of the memory expansion pack 200, an external output device such as an external speaker may also be coupled to the second ear jack 260 to output audio signals.

Figure 3:
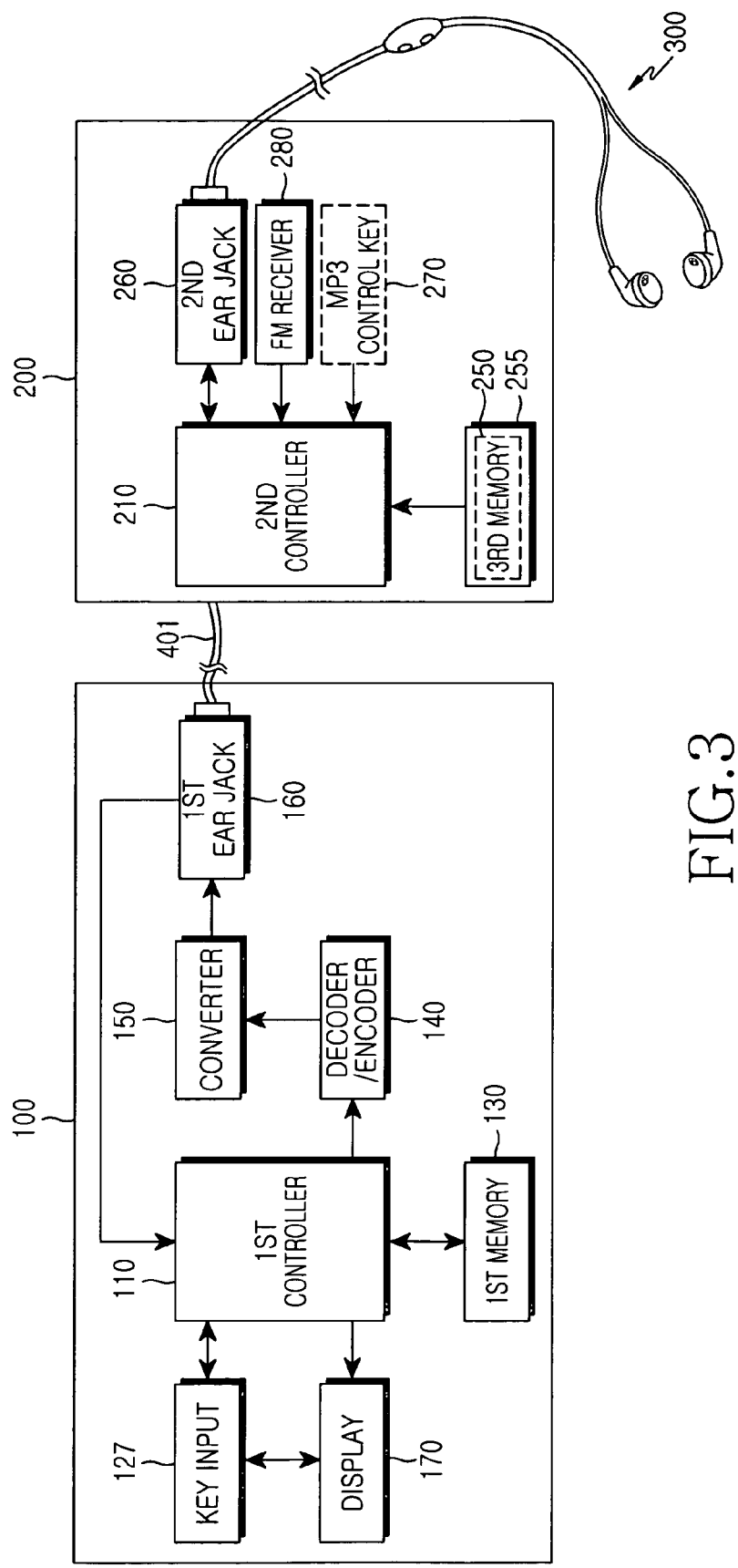
FIG. 3 is a block diagram illustrating the configuration of a memory expansion pack which is connected with a portable terminal according to a second embodiment of the present invention.

FIG. 3 is a block diagram illustrating the configuration of a memory expansion pack which is connected with a portable terminal according to a second embodiment of the present invention. The second embodiment will be described with reference to FIG. 3 under the assumption that the memory expansion pack is connected with the portable terminal through a connection line of the memory expansion pack, and an earphone, which is an external output device, is inserted in the memory expansion pack to output audio signals.

As shown in FIG. 3, the portable terminal 100 includes a first controller 110, a key input unit 127, a first memory 130, a decoder/encoder 140, a converter 150, a first ear jack 160, and a display unit 170. The memory expansion pack 200 includes a second controller 210, a third memory 250, a second ear jack 260, and an FM receiver 280. The first controller 110 in the portable terminal 100 controls the overall operations of the portable terminal 100 in accordance with a second embodiment of the present invention. The first controller 110 performs a control operation to detect whether the third memory 250 is inserted in the memory expansion pack 200, read an MP3 file stored in the third memory 250, and output the read MP3 file to the decoder/encoder 140 if the third memory 250 is inserted in the memory expansion pack 200. The first controller 110 also performs a control operation to selectively modify, add and delete MP3 files stored in the third memory 250 in the memory expansion pack 200, and also to allow MP3 files stored in the third memory 250 in the memory expansion pack 200 to be stored in the first memory 130 in the portable terminal 100.

The first controller 110 also performs a control operation to allow playback, rewind/fast-forward, stop/pause, volume-control, etc., of MP3 files stored in the third memory 250 according to key inputs of an MP3 control key provided on the key input unit 127. The first controller 110 may also perform a control operation for transmitting MP3 files stored in the third memory 250 in the memory expansion pack 200 to a specific recipient.

When a call occurs during the output of an MP3 file, the first controller 110 controls the second controller 210 in the memory expansion pack 200 to temporarily stop the output of the MP3 file and inform the user of the call occurrence. The first controller 110 may also perform a control operation for outputting audio data received through the FM receiver 280 in the memory expansion pack 200 in FM reception mode, and a control operation for encoding the audio data received through the FM receiver 280 via the decoder/encoder 140 and storing the encoded audio data in the first memory 130 or in the third memory 250.

The first controller 110 may still also perform a control operation for encoding audio data input in recording mode via the decoder/encoder 140 and storing the encoded audio data in the first memory 130 or in the third memory 250.

The decoder/encoder 140 decodes an MP3 file output from the first controller 110, and the converter 150 converts a digital audio signal of the decoded MP3 file into an analog audio signal and outputs the analog audio signal to the first ear jack 160.

Under the control of the first controller 110, the converter 150 converts an analog signal of audio data received in FM reception mode or recording mode into a digital audio signal, and the decoder/encoder 140 encodes the digital audio signal of the received audio data and stores the encoded signal in the first memory 130 or in the third memory 250.

The first ear jack 160 is connected with a connection line 401 of the memory expansion pack 200 to transfer a digital signal of an MP3 file output from the memory expansion pack 200 to the first controller 110, and transfer an analog signal of an MP3 file output from the converter 150 to the memory expansion pack 200. The first ear jack 160 transfers audio data, which is output through the FM receiver 280 in FM reception mode, to the first controller 110, and transfers an analog signal of audio data output from the converter 150 to the memory expansion pack 200. The first ear jack 160 also transfers audio data, which is input through a microphone in the earphone 300 in recording mode, to the first controller 110.

The first memory 130 may be comprised of program and data memories. The program memory can store programs for controlling general operations of the portable terminal and programs for controlling MP3 files provided from the memory expansion pack 200 connected with the portable terminal. The data memory temporarily stores data items generated during execution of the programs. The first memory 130 can download and store MP3 files stored in the third memory 250 in the memory expansion pack 200.

The first memory 130 can store audio data input in recording mode. The first memory 130 can also store audio data received in FM reception mode.

The display unit 170 displays user data output from the first controller 110. The display unit 170 may include a Liquid Crystal Display (LCD). In this case, the display unit 170 may be comprised of an LCD controller, a memory capable of storing image data, and an LCD panel. If the LCD is embodied as a touch screen, the display unit 170 can also operate as an input unit. The display unit 170 can display information of MP3 files (for example, a list of MP3 files) stored in the third memory 250 in the memory expansion pack 200. The key input unit 127 includes keys for inputting number and character information, and function keys for setting various functions. The key input unit 127 may also include an MP3 file control key.

The second controller 210 in the memory expansion pack 200 performs control operations in accordance with a second embodiment of the present invention, such as a control operation for transmitting a digital audio signal of an MP3 file stored in the third memory 250 to the first controller 110 in the portable terminal 100 through the connection line 401, and outputting an analog audio signal of the MP3 file received from the first controller 110 through an earphone 300 connected with the second ear jack 260. If a personal computer is connected with the memory expansion pack 200 through the second ear jack 260, the second controller 210 performs a control operation for allowing the third memory 250 to store an MP3 file downloaded from the personal computer. If a call occurs during the output of an MP3 file, the second controller 210 performs a control operation for temporarily stopping the output of the MP3 file and informing the user of the call occurrence under the control of the first controller 110. The second controller 210 also performs a control operation for transmitting audio data, which is received through the FM receiver 280 in FM reception mode, to the first controller 110 in the portable terminal 100, and storing the audio data encoded by the portable terminal 100 in the third memory 250 when the encoded audio data is received from the portable terminal 100.

The second controller 210 also performs a control operation for transmitting audio data, which is received through the microphone provided in the memory expansion pack 200 or in the earphone 300 in recording mode, to the portable terminal 100, and storing the audio data encoded by the portable terminal 100 in the third memory 250 when the encoded audio data is received from the portable terminal 100.

The third memory 250 can be attached to a socket 255 of the memory expansion pack 200 as a detachable expansion memory to provide an MP3 file, or can be detached from the expansion pack 200 so as to be separately carried. The third memory 250 stores MP3 files containing digital audio signals.

The third memory 250 can store audio data input in recording mode and store audio data received in FM reception mode.

If the second ear jack 260 is connected with an earphone 300, the second ear jack 260 can output the MP3 files and audio data, which is received through the FM receiver 280, through the earphone 300. If the second ear jack 260 is connected with a personal computer, the second ear jack 260 can transfer an MP3 file downloaded from the personal computer to the second controller 210.

An MP3 control key 270 may be provided on the memory expansion pack 200 and may also be provided on the earphone 300 to control the MP3 file. The memory expansion pack 200 may include a microphone for inputting a speech signal in communication mode.

The FM receiver 280 receives a frequency-modulated audio signal from an external device over a specific frequency channel as set by the user. For example, the specific frequency channel can be selected from frequencies in the range of 88.1 to 108 MHz which are not in use for public broadcasting. Here, to listen to the audio signal received from the external device using the portable terminal 100, the user preferably sets the FM receiver 280 to the same FM radio frequency as the specific frequency channel from the external device.

With reference to FIG. 3, a description will now be given of how the portable terminal 100 outputs an MP3 file using the memory expansion pack 200 according to a second embodiment of the present invention.

If the connection line 401 of the memory expansion pack 200 is connected with the first ear jack 160 of the portable terminal 100 as shown in FIG. 3, the first controller 110 detects this connection, and switches the operating mode of the portable terminal to MP3 mode.

If the user of the portable terminal selects the third memory 250 of the memory expansion pack 200 in MP3 mode, the first controller 110 detects this selection, checks whether or not the third memory 250 is inserted in the expansion pack, and displays a list of MP3 files stored in the third memory 250 on the display unit 170 if it is inserted in the expansion pack.

When the user selects playback of an MP3 file from the MP3 file list displayed on the display unit 170, the second controller 210 transmits a digital signal of the selected MP3 file stored in the third memory 250 to the first controller 110. The first controller 110 converts the digital signal of the MP3 file into an analog signal through the decoder/encoder 140 and the converter 150, and transfers the analog signal to the second controller 210. The second controller 210 then outputs the analog signal of the MP3 file through the earphone 300 connected to the second ear jack 260.

If audio data is received through the FM receiver 280 in the memory expansion pack 200 in FM reception mode, the audio data is transmitted to the portable terminal 100, and is then converted into an analog signal in the portable terminal 100. After being transmitted back to the memory expansion pack 200, the analog signal of the audio data is output through the earphone 300 inserted in the second ear jack 260.

If a storage function is selected based on user input information (for example, key inputs) in FM reception mode, audio data received through the FM receiver 280 is converted into a digital signal through the converter 150 in the portable terminal 100. After being encoded through the decoder/encoder 140, the digital signal of the received audio data is stored in the first and third memories 130 and 250.

If audio data is input through a microphone (not shown) provided in the earphone 300 connected with the memory expansion pack 200, or a microphone (not shown) in the portable terminal 100, the audio data is converted into a digital signal through the converter 150 in the portable terminal 100. After being encoded through the decoder/encoder 140, the digital signal of the received audio data is stored in the first and third memories 130 and 250.

Although a second embodiment of the present invention has been described under the assumption that the earphone 300 is inserted in the second ear jack 260 of the memory expansion pack 200, an external output device such as an external speaker may also be coupled to the second ear jack 260 to output audio signals.

Figure 4:
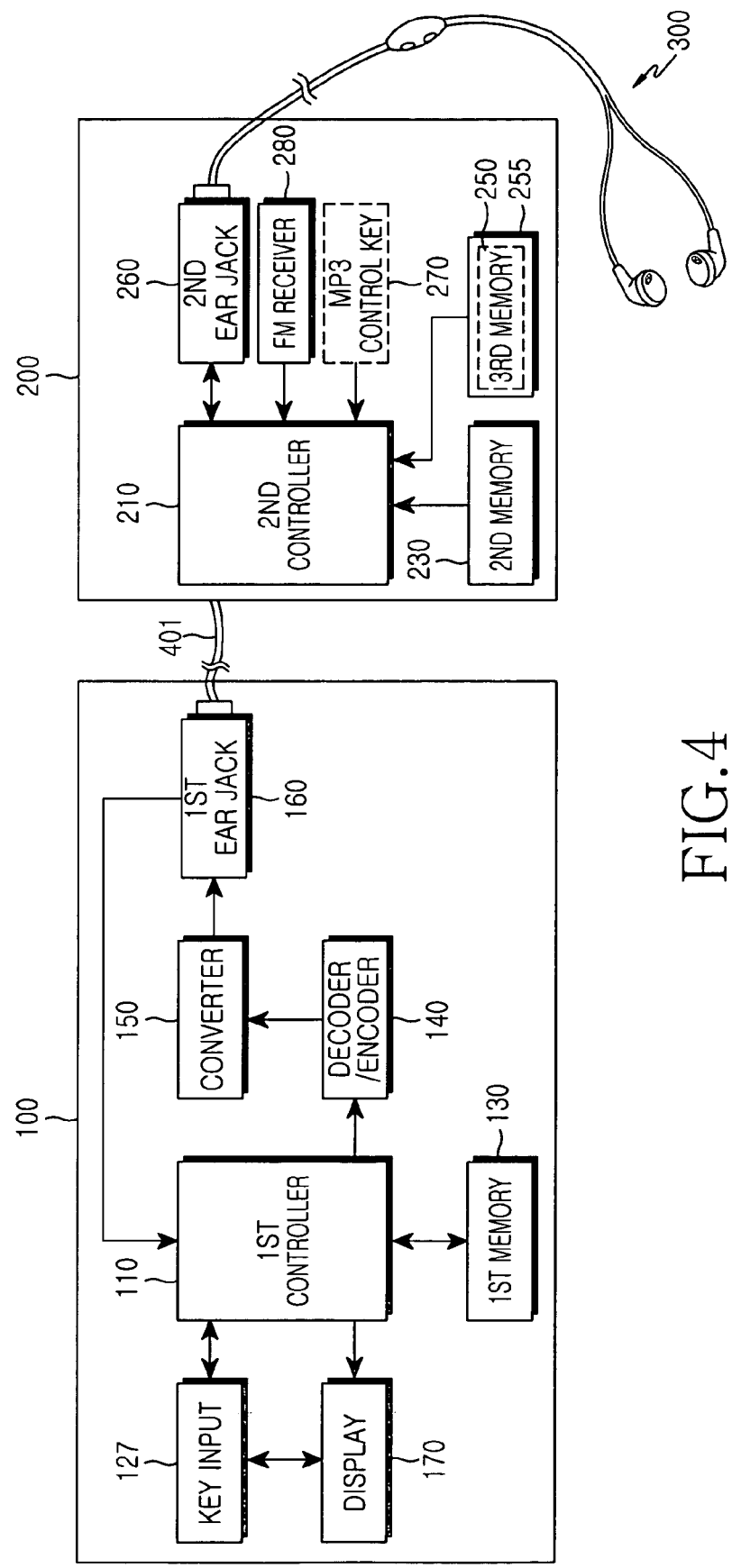
FIG. 4 is a block diagram illustrating the configuration of a memory expansion pack which is connected with a portable terminal according to a third embodiment of the present invention.

FIG. 4 is a block diagram illustrating the configuration of a memory expansion pack which is connected with a portable terminal according to a third embodiment of the present invention. The third embodiment will be described with reference to FIG. 4 under the assumption that the memory expansion pack is connected with the portable terminal through a connection line of the memory expansion pack, and wherein an earphone, which is an external output device, is inserted in the memory expansion pack to output audio signals.

As shown in FIG. 4, the portable terminal 100 includes a first controller 110, a key input unit 127, a first memory 130, a decoder/encoder 140, a converter 150, a first ear jack 160, and a display unit 170. The memory expansion pack 200 includes a second controller 210, a second memory 230, a third memory 250, a second ear jack 260, and an FM receiver 280. The first controller 110 in the portable terminal 100 controls the overall operations of the portable terminal 100 in accordance with a third embodiment of the present invention. The first controller 110 performs a control operation to read MP3 files stored in the second memory 230, which is a built-in expansion memory, and in the third memory 250, which is a detachable expansion memory, and outputs the read MP3 files to the decoder/encoder 140. If the user selects the third memory 250, the first controller 110 determines whether the third memory 250 is inserted in the memory expansion pack 200. The first controller 110 also performs a control operation to selectively modify, add and delete MP3 files stored in the second and third memories 230 and 250 in the memory expansion pack 200, and also to allow MP3 files stored in the second and third memories 230 and 250 in the memory expansion pack 200 to be stored in the first memory 130 in the portable terminal 100.

The first controller 110 also performs a control operation to allow playback, rewind/fast-forward, stop/pause, volume-control, etc., of MP3 files stored in the second and third memories 230 and 250 according to key inputs of an MP3 control key provided on the key input unit 127. The first controller 110 may also perform a control operation for transmitting MP3 files stored in the second and third memories 230 and 250 in the memory expansion pack 200 to a specific recipient.

If a call occurs during the output of an MP3 file, the first controller 110 controls the second controller 210 in the memory expansion pack 200 to temporarily stop the output of the MP3 file and inform the user of the call occurrence. The first controller 110 may also perform a control operation for outputting audio data received through the FM receiver 280 in the memory expansion pack 200 in FM reception mode, and a control operation for encoding the audio data received through the FM receiver 280 via the decoder/encoder 140 and storing the encoded audio data in the first memory 130, or in the second and third memories 230 and 250 in the memory expansion pack 200.

The first controller 110 may still also perform a control operation for encoding audio data input in the recording mode via the decoder/encoder 140 and storing the encoded audio data in the first memory 130, or in the second and third memories 230 and 250 in the memory expansion pack 200.

The decoder/encoder 140 decodes an MP3 file output from the first controller 110, and the converter 150 converts a digital audio signal of the decoded MP3 file into an analog audio signal, and outputs the analog audio signal to the first ear jack 160. Under the control of the first controller 110, the converter 150 converts an analog signal of audio data received in FM reception mode or recording mode into a digital audio signal, and the decoder/encoder 140 encodes the digital audio signal of the received audio data and stores the encoded signal in the first memory 130, or in the second and third memories 230 and 250 in the memory expansion pack 200.

The first ear jack 160 is connected with a connection line 401 of the memory expansion pack 200 to transfer a digital signal of an MP3 file output from the memory expansion pack 200 to the first controller 110, and transfer an analog signal of an MP3 file output from the converter 150 to the memory expansion pack 200. The first ear jack 160 transfers audio data, which is output through the FM receiver 280 in the memory expansion pack 200 in FM reception mode, to the first controller 110, and transfers an analog signal of audio data output from the converter 150 in the portable terminal 100 to the memory expansion pack 200. The first ear jack 160 also transfers audio data, which is input through a microphone in the earphone 300 in recording mode, to the first controller 110.

The first memory 130 may be comprised of program and data memories. The program memory can store programs for controlling general operations of the portable terminal and programs for controlling MP3 files provided from the memory expansion pack 200 connected with the portable terminal. The data memory temporarily stores data items generated during execution of the programs.

The first memory 130 can download and store MP3 files stored in the second and third memories 230 and 250 in the memory expansion pack 200. The first memory 130 can store audio data input in recording mode. The first memory 130 can also store audio data received in FM reception mode.

The display unit 170 displays user data output from the first controller 110. The display unit 170 may include a Liquid Crystal Display (LCD). In this case, the display unit 170 may be comprised of an LCD controller, a memory capable of storing image data, and an LCD panel. If the LCD is embodied as a touch screen, the display unit 170 can also operate as an input unit.

The display unit 170 can display information of MP3 files (for example, a list of MP3 files) stored in the second and third memories 230 and 250 in the memory expansion pack 200.

The key input unit 127 includes keys for inputting number and character information and function keys for setting various functions. The key input unit 127 may also include an MP3 file control key.

The second controller 210 in the memory expansion pack 200 performs control operations in accordance with a third embodiment of the present invention, such as a control operation for transmitting a digital audio signal of an MP3 file stored in the second and third memories 230 and 250 to the first controller 110 in the portable terminal 100 through the connection line 401, and outputting an analog audio signal of the MP3 file received from the first controller 110 through an earphone 300 connected with the second ear jack 260. If a personal computer is connected with the memory expansion pack 200 through the second ear jack 260, the second controller 210 performs a control operation for allowing the second and third memories 230 and 250 to store an MP3 file downloaded from the personal computer. If a call occurs during the output of an MP3 file, the second controller 210 performs a control operation for temporarily stopping the output of the MP3 file and informing the user of the call occurrence under the control of the first controller 110.

The second controller 210 also performs a control operation for transmitting audio data, which is received through the FM receiver 280 in FM reception mode, to the first controller 110 in the portable terminal 100, and storing the audio data encoded by the portable terminal 100 in the second and third memories 230 and 250 when the encoded audio data is received from the portable terminal 100.

The second controller 210 also performs a control operation for transmitting audio data, which is received through the microphone provided in the memory expansion pack 200 or in the earphone 300 in recording mode, to the portable terminal 100, and storing the audio data encoded by the portable terminal 100 in the second and third memories 230 and 250 when the encoded audio data is received from the portable terminal 100.

The second memory 230 is a built-in expansion memory for storing digital audio signals of MP3 files, and the third memory 250 is a detachable expansion memory for storing digital audio signals of MP3 files. The third memory 250 can be attached to a socket 255 of the memory expansion pack 200 to provide an MP3 file, or can be detached from the expansion pack 200 so as to be separately carried.

The second and third memories 230 and 250 can store audio data input in recording mode and store audio data received in FM reception mode.

If the second ear jack 260 is connected with an earphone 300, the second ear jack 260 outputs the MP3 files and audio data, which is received through the FM receiver 280, through the earphone 300. If the second ear jack 260 is connected with a personal computer, the second ear jack 260 transfers an MP3 file downloaded from the personal computer to the second controller 210.

An MP3 control key 270 may be provided on the memory expansion pack 200 and may also be provided on the earphone 300 to control the MP3 file. The memory expansion pack 200 may also include a microphone for inputting a speech signal in communication mode.

The FM receiver 280 receives a frequency-modulated audio signal from an external device over a specific frequency channel as set by the user. For example, the specific frequency channel can be selected from frequencies in the range of 88.1 to 108 MHz which are not in use for public broadcasting. Here, to listen to the audio signal received from the external device using the portable terminal 100, the user preferably sets the FM receiver 280 to the same FM radio frequency as the specific frequency channel from the external device.

With reference to FIG. 4, a description will now be given of how the portable terminal 100 outputs an MP3 file using the memory expansion pack 200 according to a third embodiment of the present invention.

If the connection line 401 of the memory expansion pack 200 is connected with the first ear jack 160 of the portable terminal 100 as shown in FIG. 4, the first controller 110 detects this connection, and switches the operating mode of the portable terminal to MP3 mode. If the user of the portable terminal selects the first or third memory 230 or 250 of the memory expansion pack 200 in MP3 mode, the first controller 110 displays a list of MP3 files stored in the selected memory on the display unit 170. When the user selects playback of an MP3 file from the MP3 file list displayed on the display unit 170, the second controller 210 transmits a digital signal of the selected MP3 file stored in the selected memory to the first controller 110.

The first controller 110 converts the digital signal of the MP3 file into an analog signal through the decoder/encoder 140 and the converter 150, and transfers the analog signal to the second controller 210. The second controller 210 then outputs the analog signal of the MP3 file through the earphone 300 connected to the second ear jack 260.

If audio data is received through the FM receiver 280 in the memory expansion pack 200 in FM reception mode, the audio data is transmitted to the portable terminal 100, and is then converted into an analog signal in the portable terminal 100. After being transmitted back to the memory expansion pack 200, the analog signal of the audio data is output through the earphone 300 inserted in the second ear jack 260.

If a storage function is selected based on user input information (for example, key inputs) in FM reception mode, audio data received through the FM receiver 280 is converted into a digital signal through the converter 150 in the portable terminal 100. After being encoded through the decoder/encoder 140, the digital signal of the received audio data is stored in the first memory 130 in the portable terminal 100, or in the second and third memories 230 and 250 in the memory expansion pack 200.

If audio data is input through a microphone (not shown) provided in the earphone 300 connected with the memory expansion pack 200 or a microphone (not shown) in the portable terminal 100, the audio data is converted into a digital signal through the converter 150 in the portable terminal 100. After being encoded through the decoder/encoder 140, the digital signal of the received audio data is stored in the first memory 130 in the portable terminal 100, or in the second and third memories 230 and 250 in the memory expansion pack 200.

Although a third embodiment of the present invention has been described under the assumption that the earphone 300 is inserted in the second ear jack 260 of the memory expansion pack 200, an external output device such as an external speaker may also be coupled to the second ear jack 260 to output audio signals.

Figure 5:
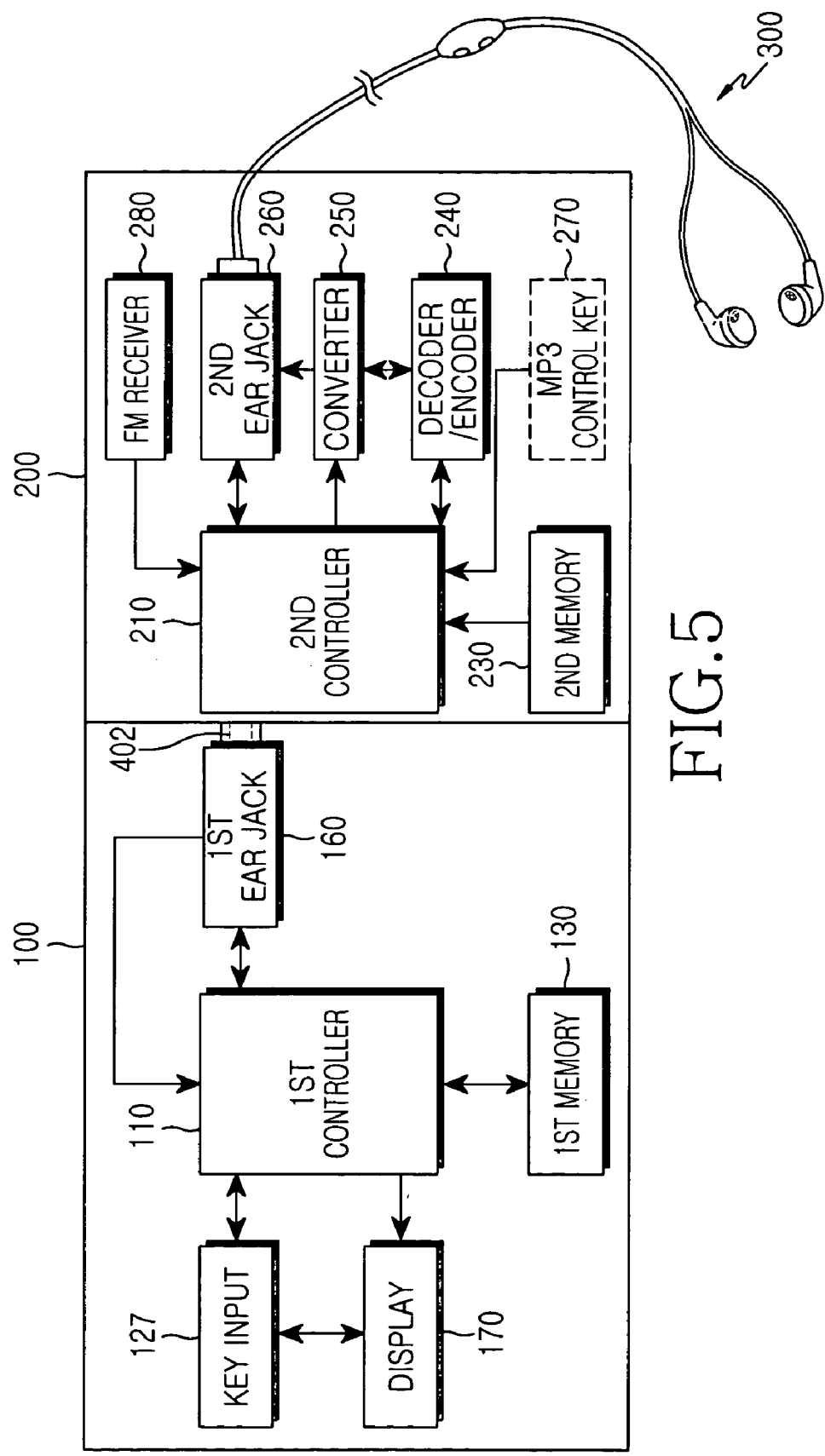
FIG. 5 is a block diagram illustrating the configuration of a memory expansion pack which is connected with a portable terminal according to a fourth embodiment of the present invention.

FIG. 5 is a block diagram illustrating the configuration of a memory expansion pack which is connected with a portable terminal according to a fourth embodiment of the present invention. The fourth embodiment will be described with reference to FIG. 5 under the assumption that the memory expansion pack is directly connected with the portable terminal using a plug of the memory expansion pack, and wherein an earphone, which is an external output device, is inserted in the memory expansion pack to output audio signals. Although the fourth embodiment will be described under the assumption that the memory expansion pack includes a single built-in memory, the memory expansion pack may include a detachable memory as shown in FIG. 3, or both the built-in and detachable memories as shown in FIG. 4.

As shown in FIG. 5, the portable terminal 100 includes a first controller 110, a key input unit 127, a first memory 130, a first ear jack 160, and a display unit 170. The memory expansion pack 200 includes a second controller 210, a second memory 230, a decoder/encoder 240, a converter 250, a second ear jack 260, and an FM receiver 280. The first controller 110 in the portable terminal 100 controls the overall operations of the portable terminal 100 in accordance with a fourth embodiment of the present invention. The first controller 110 performs a control operation to selectively modify, add and delete MP3 files stored in the second memory 230 in the memory expansion pack 200, and also to allow MP3 files stored in the second memory 230 in the memory expansion pack 200 to be stored in the first memory 130 in the portable terminal 100.

The first controller 110 also performs a control operation to allow playback, rewind/fast-forward, stop/pause, volume-control, etc., of MP3 files stored in the second memory 230 according to key inputs of an MP3 control key provided on the key input unit 127. The MP3 control key enables the user to perform playback, rewind/fast-forward, stop/pause, volume-control, etc., of MP3 files.

The first controller 110 may also perform a control operation for transmitting MP3 files stored in the second memory 230 in the memory expansion pack 200 to a specific recipient. If a call occurs during the output of an MP3 file, the first controller 110 controls the second controller 210 in the memory expansion pack 200 to temporarily stop the output of the MP3 file and inform the user of the call occurrence.

The first controller 110 may also perform a control operation for outputting audio data received through the FM receiver 280 in the memory expansion pack 200 in FM reception mode, and a control operation for encoding the audio data received through the FM receiver 280 via the decoder/encoder 240 provided in the memory expansion pack 200 and storing the encoded audio data in the first memory 130, or in the second memory 230 of the memory expansion pack 200.

The first controller 110 may also perform a control operation for encoding audio data input in recording mode via the decoder/encoder 240 in the memory expansion pack 200 and storing the encoded audio data in the first memory 130, or in the second memory 230 of the memory expansion pack 200.

The first ear jack 160 is connected with a plug 402 of the memory expansion pack 200 to read an MP3 file stored in the memory expansion pack 200. The first ear jack 160 transfers audio data, which is encoded by the decoder/encoder 240 in the memory expansion pack 200 in FM reception mode, to the first controller 110.

The first ear jack 160 also transfers audio data, which is encoded in the memory expansion pack 200 after being input through a microphone provided in the memory expansion pack 200 or in the earphone 300 in recording mode, to the first controller 110.

The first memory 130 may be comprised of program and data memories. The program memory can store programs for controlling general operations of the portable terminal and programs for controlling MP3 files provided from the memory expansion pack 200 connected with the portable terminal. The data memory temporarily stores data items generated during execution of the programs.

The first memory 130 can download and store MP3 files stored in the second memory 230 in the memory expansion pack 200. The first memory 130 can store audio data input in recording mode. The first memory 130 can also store audio data received in FM reception mode.

The display unit 170 displays user data output from the first controller 110. The display unit 170 may include a Liquid Crystal Display (LCD). In this case, the display unit 170 may be comprised of an LCD controller, a memory capable of storing image data, and an LCD panel. If the LCD is embodied as a touch screen, the display unit 170 can also operate as an input unit.

The display unit 170 can display information of MP3 files (for example, a list of MP3 files) stored in the second memory 230 in the memory expansion pack 200.

The key input unit 127 includes keys for inputting number and character information, and function keys for setting various functions. The key input unit 127 may also include an MP3 file control key.

The second controller 210 in the memory expansion pack 200 performs control operations in accordance with a fourth embodiment of the present invention, such as a control operation for decoding an MP3 file stored in the first memory 130 or the second memory 230 selected by the user of the portable terminal, converting a digital signal of the decoded MP3 file into an analog signal, and outputting the analog signal of the MP3 file through an earphone 300 connected with the second ear jack 260. If a personal computer is connected with the memory expansion pack 200 through the second ear jack 260, the second controller 210 performs a control operation for allowing the second memory 230 to store an MP3 file downloaded from the personal computer. If a call occurs during the output of an MP3 file, the second controller 210 performs a control operation for temporarily stopping the output of the MP3 file and informing the user of the call occurrence under the control of the first controller 110.

The second controller 210 converts audio data, which is received through the FM receiver 280, into an analog signal, and outputs the analog signal to the earphone 300 inserted in the second ear jack 260, or transfers the analog signal to the portable terminal 100.

The second controller 210 encodes audio data, which is input through the microphone provided in the earphone 300 or in the memory expansion pack 200 in recording mode, in the second memory 230, or transfers the audio data to the portable terminal 100.

The decoder/encoder 240 decodes an MP3 file output from the second controller 210, and the converter 250 converts a digital audio signal of the decoded MP3 file into an analog audio signal, and outputs the analog audio signal to the second ear jack 260.

Under the control of the second controller 210, the converter 250 converts an analog signal of audio data, which is received in FM reception mode or recording mode, into a digital audio signal, and the decoder/encoder 240 encodes the digital audio signal of the received audio data. The encoded audio data is stored in the second memory 230, or in the first memory 130 in the portable terminal 130.

The second memory 230 stores MP3 files containing digital audio signals. The second memory 230 can store audio data input in recording mode and store audio data received in FM reception mode.

If the second ear jack 260 is connected with an earphone 300, the second ear jack 260 outputs the MP3 files and audio data, which is received through the FM receiver 280, through the earphone 300. If the second ear jack 260 is connected with a personal computer, the second ear jack 260 transfers an MP3 file downloaded from the personal computer to the second controller 210.

An MP3 control key 270 may be provided on the memory expansion pack 200 and may also be provided on the earphone 300 to control the MP3 file. The memory expansion pack 200 may also include a microphone for inputting a speech signal in communication mode.

The FM receiver 280 receives a frequency-modulated audio signal from an external device over a specific frequency channel as set by the user. For example, the specific frequency channel can be selected from frequencies in the range of 88.1 to 108 MHz which are not in use for public broadcasting. Here, to listen to the audio signal received from the external device using the portable terminal 100, the user preferably sets the FM receiver 280 to the same FM radio frequency as the specific frequency channel from the external device.

With reference to FIG. 5, a description will now be given of how the portable terminal 100 outputs an MP3 file using the memory expansion pack 200 according to a fourth embodiment of the present invention.

If the plug 402 of the memory expansion pack 200 is connected with the first ear jack 160 of the portable terminal 100 as shown in FIG. 5, the first controller 110 detects this connection, and switches the operating mode of the portable terminal 100 to MP3 mode.

If the user of the portable terminal selects the second memory 230 of the memory expansion pack 200 in MP3 mode, the first controller 110 detects this selection, and displays a list of MP3 files stored in the second memory 230 on the display unit 170. When the user selects playback of an MP3 file from the MP3 file list displayed on the display unit 170, the second controller 210 decodes a digital signal of the selected MP3 file stored in the second memory 230 through the decoder/encoder 240, and converts the digital signal of the MP3 file into an analog signal through the converter 250.

The second controller 210 then outputs the analog signal of the MP3 file through the earphone 300 connected to the second ear jack 260.

Alternatively, if the user of the portable terminal selects the first memory 130 in the portable terminal 100 in MP3 mode, the first controller 110 detects this selection, and displays a list of MP3 files stored in the first memory 130 on the display unit 170. When the user selects playback of an MP3 file from the MP3 file list displayed on the display unit 170, the first controller 110 transmits the selected MP3 file stored in the first memory 130 to the memory expansion pack 200. The second controller 210 in the memory expansion pack 200 decodes the MP3 file received from the portable terminal 100 through the decoder/encoder 240, and then converts a digital signal of the decoded MP3 file into an analog signal through the converter 250.

The second controller 210 then outputs the analog signal of the MP3 file through the earphone 300 connected to the second ear jack 260.

If audio data is received through the FM receiver 280 in the memory expansion pack 200 in FM reception mode, the audio data is converted into an analog signal in the memory expansion pack 200, and then output through the earphone 300 or transmitted to the portable terminal 100 to be output.

If a storage function is selected based on user input information (for example, key inputs) in FM reception mode, audio data received through the FM receiver 280 is converted into a digital signal through the converter 250 in the memory expansion pack 200. After being encoded through the decoder/encoder 240, the digital signal of the received audio data is stored in the first memory 130 in the portable terminal 100 and the second memory 230 in the memory expansion pack 200.

If audio data is received through a microphone (not shown) provided in the earphone 300 connected with the memory expansion pack 200 or a microphone (not shown) in the portable terminal 100, the audio data is converted into a digital signal through the converter 250 in the memory expansion pack 200. After being encoded through the decoder/encoder 240, the digital signal of the received audio data is stored in the first memory 130 in the portable terminal 100 and the second memory 230 in the memory expansion pack 200.

Although a fourth embodiment of the present invention has been described under the assumption that the earphone 300 is inserted in the second ear jack 260 of the memory expansion pack 200, an external output device such as an external speaker may also be coupled to the second ear jack 260 to output audio signals.

Figure 6:
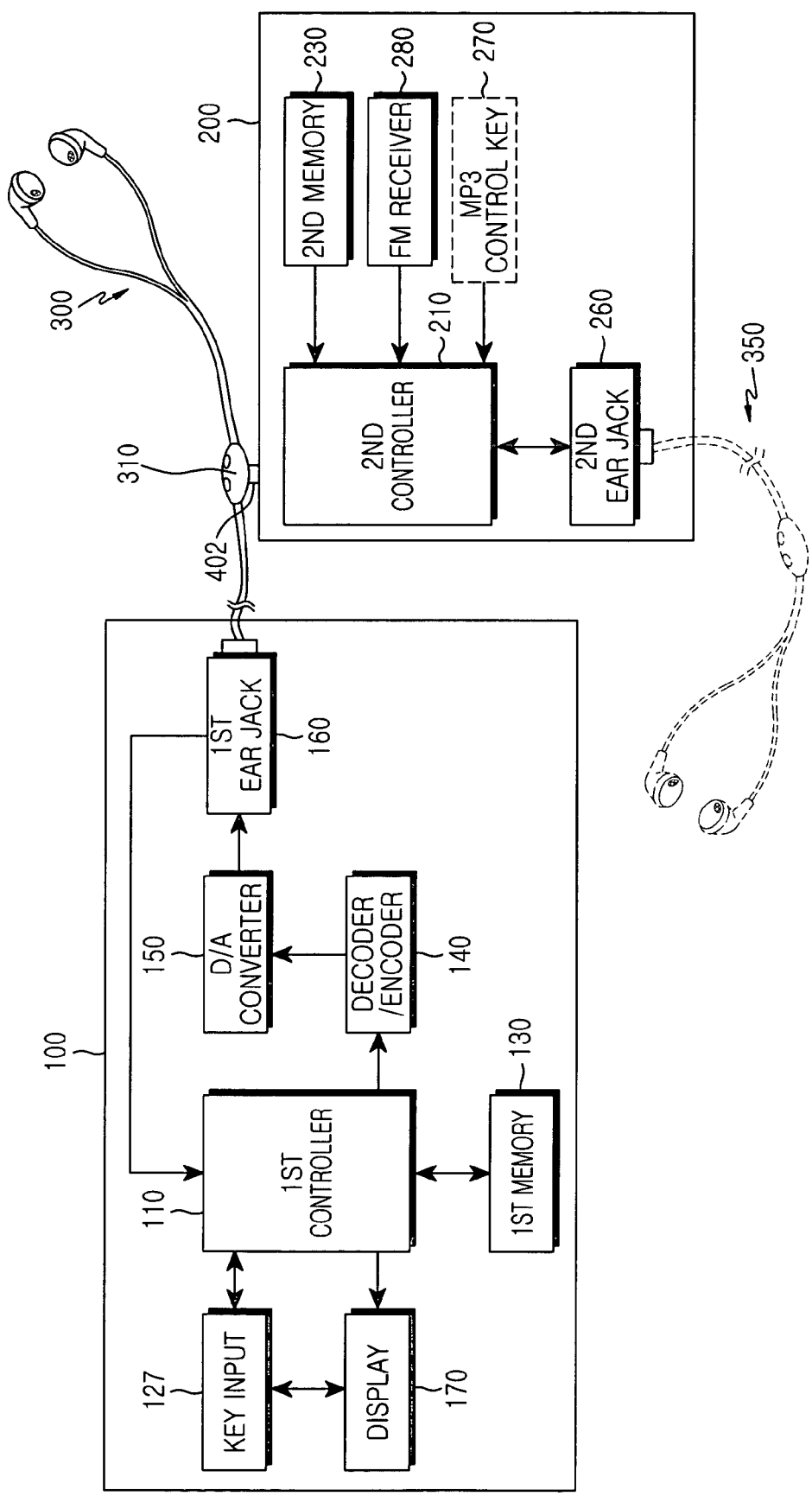
FIG. 6 is a block diagram illustrating the configuration of a memory expansion pack which is connected with an earphone, wherein the earphone is further connected with a portable terminal, according to a fifth embodiment of the present invention.

FIG. 6 is a block diagram illustrating the configuration of a memory expansion pack which is connected with an earphone connected with a portable terminal according to a fifth embodiment of the present invention.

As shown in FIG. 6, the portable terminal 100 includes a first controller 110, a key input unit 127, a first memory 130, a decoder/encoder 140, a converter 150, a first ear jack 160, and a display unit 170. The memory expansion pack 200 includes a second controller 210, a second memory 230, a second ear jack 260, and an FM receiver 280. The memory expansion pack 200 is connected with a controller 310 in an earphone 300, which is connected with the portable terminal 100, using a plug 402 of the expansion pack 200. The controller 310 in the earphone 300 includes control keys for controlling audio signals output through the earphone 300, and also has a jack for connection with the memory expansion pack 200. The portable terminal 100 and the memory expansion pack 200 may have the same configuration as described above in the first to fourth embodiments.

When the memory expansion pack 200 is connected with the earphone 300 which is connected with the portable terminal 100, another earphone 350, which is an external output device, may be connected with the second ear jack 260 in the memory expansion pack 200, so that the two earphones can output audio signals at the same time.

With reference to FIG. 6, a description will now be given of how the portable terminal 100 outputs an MP3 file using the memory expansion pack 200 according to a fifth embodiment of the present invention.

If the plug 402 of the memory expansion pack 200 is connected with the first ear jack 160 of the portable terminal 100 as shown in FIG. 6, the first controller 110 detects this connection, and switches the operating mode of the portable terminal 100 to MP3 mode.

If the user of the portable terminal selects the second memory 230 of the memory expansion pack 200 in MP3 mode, the first controller 110 detects this selection, and displays a list of MP3 files stored in the second memory 230 on the display unit 170. When the user selects playback of an MP3 file from the MP3 file list displayed on the display unit 170, the second controller 210 transmits a digital signal of the selected MP3 file stored in the second memory 230 to the first controller 110. The first controller 110 converts the digital signal of the MP3 file into an analog signal through the decoder/encoder 140 and the converter 150, and transfers the analog signal to the second controller 210. The second controller 210 then outputs the analog signal of the MP3 file through the earphone 300. If another earphone 350 is connected with the second ear jack 260, the second controller 210 detects this connection, and allows the two earphones 300 and 350 to output the analog signal of the MP3 file at the same time.

If audio data is received through the FM receiver 280 in the memory expansion pack 200 in FM reception mode, the audio data is transmitted to the portable terminal 100, and is then converted into an analog signal in the portable terminal 100. After being transmitted back to the memory expansion pack 200, the analog signal of the audio data is output through the earphone 300.

If a storage function is selected based on user input information (for example, key inputs) in FM reception mode, audio data received through the FM receiver 280 is converted into a digital signal through the converter 150 in the portable terminal 100. After being encoded through the decoder/encoder 140, the digital signal of the received audio data is stored in the first and second memories 130 and 230.

If audio data is received through a microphone (not shown) provided in the earphone 300 connected with the memory expansion pack 200 or a microphone (not shown) in the portable terminal 100, the audio data is converted into a digital signal through the converter 150 in the portable terminal 100. After being encoded through the decoder/encoder 140, the digital signal of the received audio data is stored in the first and second memories 130 and 230.

Although a fifth embodiment of the present invention has been described under the assumption that the memory expansion pack 200 includes a single, built-in memory, the memory expansion pack may include a detachable memory as shown in FIG. 3, or both the built-in and detachable memories as shown in FIG. 4. The memory expansion pack 200 can be connected with the controller 310 of the earphone 300, which is connected with the portable terminal 100, not only using the plug 402, but also through a connection line.

Although the above embodiments of the present invention have been described under the assumption that the earphone 300 is inserted in the second ear jack 260 of the memory expansion pack 200, an external output device such as an external speaker may also be coupled to the second ear jack 260 to output audio signals. Further, according to the embodiments of the present invention, the FM receiver 280 may be provided not only in the memory expansion pack 200, but also in the portable terminal 100.

Figure 7:
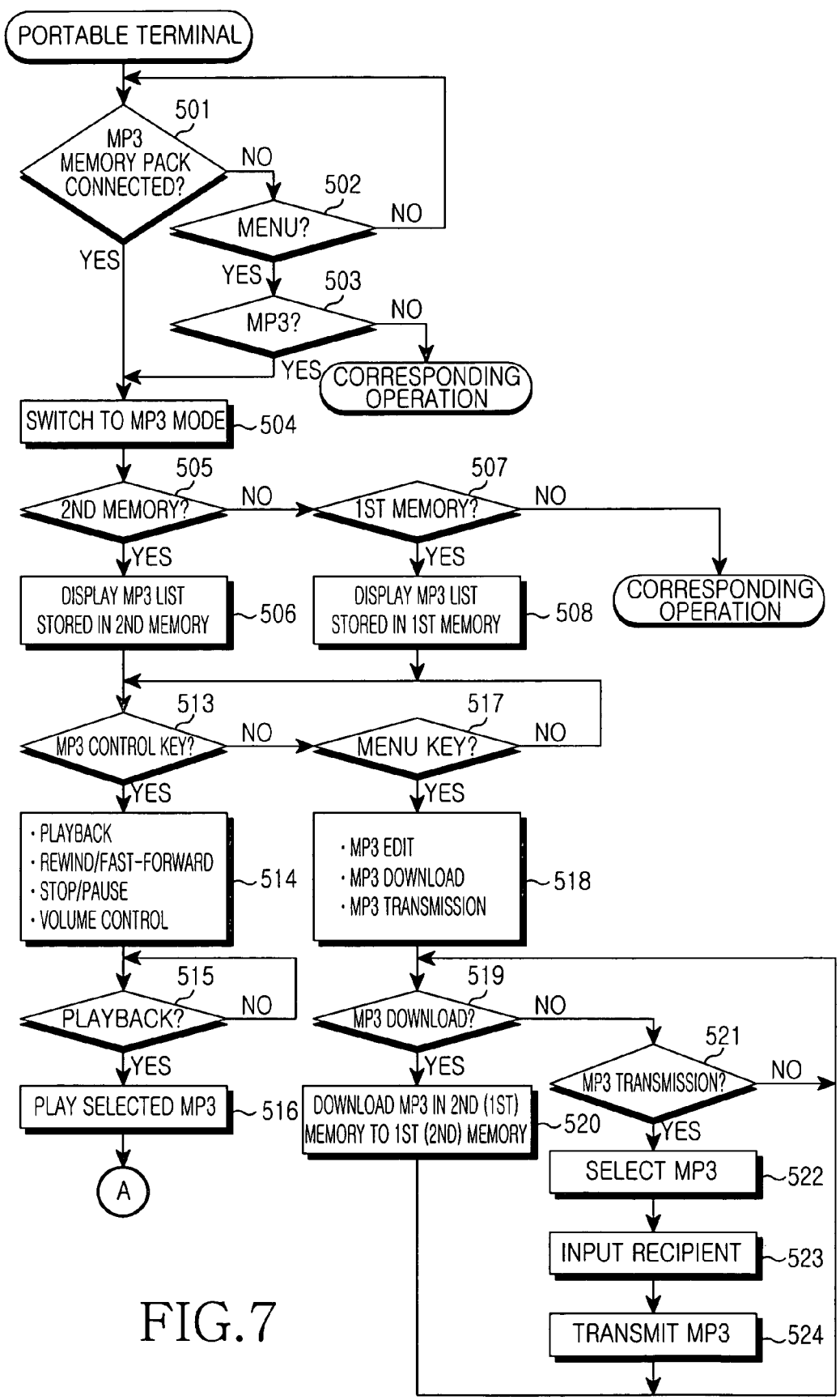
FIG. 7 is a flow chart illustrating a method for providing MP3 content from a memory expansion pack, including a built-in memory, to a portable terminal connected with the expansion pack, according to an embodiment of the present invention.

FIG. 7 is a flow chart illustrating a method for providing MP3 content from a memory expansion pack, including a built-in memory, to a portable terminal connected with the expansion pack, according to an embodiment of the present invention.

First, the method of FIG. 7 is described in detail with reference to FIG. 2. If the connection line 401 of the memory expansion pack 200 is inserted in the first ear jack 160 of the portable terminal 100, the first controller 110 detects this insertion at step 501, and proceeds to step 504 to switch to MP3 mode. Alternatively, if the user of the portable terminal selects a menu in the portable terminal, the first controller 110 detects this selection at step 502, and displays menu items. If the user selects an MP3 menu item from the displayed menu items, the first controller 110 detects this selection at step 503, and proceeds to step 504 to switch to MP3 mode.

If the user selects the second memory 230 in MP3 mode, the first controller 110 detects this selection at step 505, and proceeds to step 506 to control the second controller 210 to read MP3 files stored in the second memory 230 and display a list of the MP3 files on the display unit 170.

If the user selects the MP3 control key with MP3 files in the second memory 230 displayed on the display unit 170, the first controller 110 detects this selection at step 513, and proceeds to step 514 to display control key items for the MP3 files on the display unit 170.

If the user selects playback of an MP3 file from the displayed MP3 file list at step 514, the first controller 110 detects this selection at step 515, and proceeds to step 516 to play the selected MP3 file.

At step 516, under the control of the first controller 110, the second controller 210 transmits a digital signal of the selected MP3 file stored in the second memory 230 to the first controller 110 through the first ear jack 160 in which the connection line 401 is inserted. When receiving the digital signal of the MP3 file from the second controller 210, the first controller 110 transmits the received digital signal of the MP3 file to the decoder/encoder 140.

The decoder/encoder 140 decodes the MP3 file and transmits the decoded MP3 file to the converter 150. The converter 150 converts a digital signal of the decoded MP3 file into an analog signal, and transmits the analog signal to the memory expansion pack 200 through the connection line 401 inserted in the first ear jack 160.

When receiving the analog signal of the MP3 file selected by the user from the converter 150, the second controller 210 outputs the analog signal of the MP3 file through the earphone 300 connected with the second ear jack 260 at step 516. If the earphone 300 is not connected with the second ear jack 260, the first controller 110 detects this lack of connection, and allows the speaker of the portable terminal to output the analog signal of the MP3 file.

Figure 10:
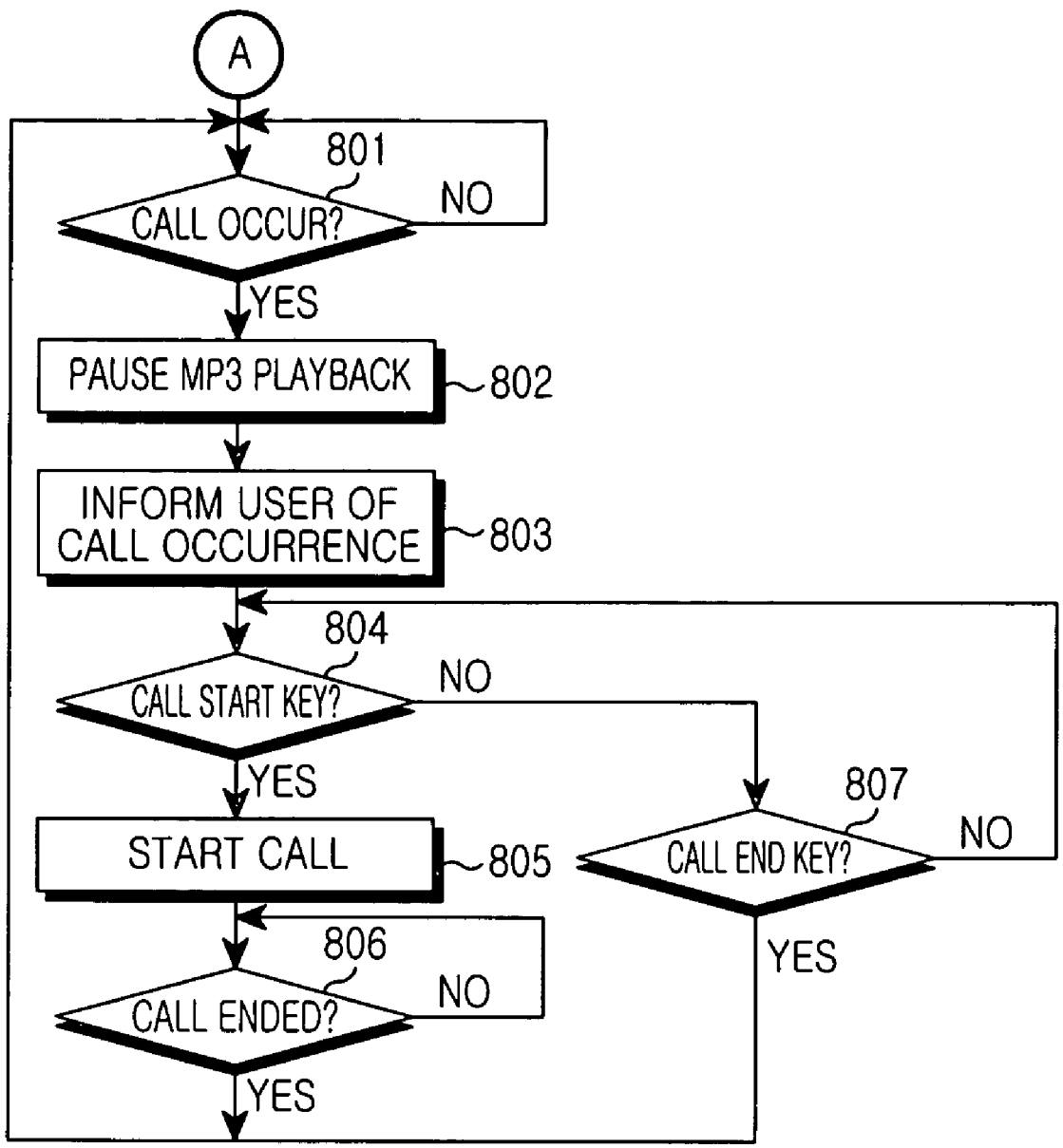
FIG. 10 is a flow chart illustrating a method for processing a call occurring when an MP3 file is being output from a portable terminal connected with a memory expansion pack according to the embodiments of the present invention.

If a call occurs while the MP3 file is being output through the earphone 300, the first controller 110 detects the call occurrence at step 801, and proceeds to step 802 as shown in FIG. 10. The first controller 110 temporarily stops (i.e., pauses) the MP3 file from being output to the memory expansion pack 200 at step 802, and controls the second controller 210 to inform the user of the call occurrence at step 803 through the earphone 300. If the user recognizes the call occurrence and inputs a call start key, the first controller 110 detects this key input at step 804, and proceeds to step 805 to start the call. If the user ends the call, the first controller 110 detects the call end at step 806, and returns to step 516 of FIG. 7 to resume playback of the MP3 file.

However, if the user inputs a call end key so as not to receive the call after recognizing the call occurrence, the first controller 110 detects this key input at step 807, and returns to step 516 of FIG. 7 to resume playback of the MP3 file.

If an SMS message is received or an alarm sounds during the output of the MP3 file, the second controller 210 performs a control operation for temporarily stopping the output of the MP3 file under the control of the first controller 110 and resuming the output of the MP3 file after informing the user of the SMS reception or the alarm sounding.

If the user inputs a menu key when the list of MP3 files stored in the second memory 230 is displayed at step 506, the first controller 110 detects the menu key input at step 517, and proceeds to step 518 to display MP3 control menu items.

If the user selects a menu item "MP3 edit" at step 518, the first controller 110 detects this selection, and enters MP3 edit mode in which the user can selectively add, modify and delete MP3 files in the second memory 230. If the user selects a menu item "MP3 download" at step 518, the first controller 110 detects this selection at step 519, and proceeds to step 520 to selectively download MP3 files stored in the second memory 230 to the first memory 130 and store them in the first memory 130, or to selectively download MP3 files stored in the first memory 130 to the second memory 230 and store them in the second memory 230. If the user selects a menu item "MP3 transmission", the first controller 110 detects this selection at step 521, and proceeds to step 522 to allow the user to select an MP3 file to transmit from among the MP3 files stored in the second memory 230. The first controller 100 then allows the user to input a recipient number at step 523, and then proceeds to step 524 to transmit the selected MP3 file to the input recipient number.

If the user selects the first memory 130 in MP3 mode at step 504, the first controller 110 detects this selection at step 507, and reads MP3 files stored in the first memory 130 and then displays a list of the MP3 files on the display unit 170 at step 508.

If the user selects the MP3 control key with MP3 files in the first memory 130 displayed on the display unit 170, the first controller 110 detects this selection at step 513, and proceeds to step 514 to display control key items for the MP3 files on the display unit 170.

If the user selects playback of an MP3 file from the displayed MP3 file list at step 514, the first controller 110 detects this selection at step 515, and proceeds to step 516 to play the selected MP3 file. At step 516, the first controller 110 converts a digital signal of the selected MP3 file stored in the first memory 130 into an analog signal through the decoder/encoder 140 and the converter 150, and transmits the analog signal of the selected MP3 file to the memory expansion pack 200 through the connection line 401 inserted in the first ear jack 160. When receiving the analog signal of the MP3 file selected by the user from the first controller 110, the second controller 210 outputs the analog signal of the MP3 file through the earphone 300 connected with the second ear jack 260 at step 516. If a call occurs during the output of the MP3 file, the procedure of steps 801 to 807 of FIG. 10 is performed under the control of the first controller 110. If the user inputs the menu key when the list of MP3 files stored in the first memory 230 is displayed at step 508, the procedure of steps 517 to 524 is performed to edit, download, and transmit the MP3 files stored in the first memory 130.

The method of FIG. 7 will now be described in detail with reference to the embodiment shown in FIG. 5. If the plug 402 of the memory expansion pack 200 is inserted in the first ear jack 160 of the portable terminal 100, the first controller 110 detects this insertion at step 501, and proceeds to step 504 to switch to MP3 mode. If the user of the portable terminal 100 selects an MP3 control key item "playback" of an MP3 file stored in the second memory 230 in the memory expansion pack 200 in the procedure of steps 505 to 508, and steps 513 and 514, the first controller 110 detects this selection at step 515, and proceeds to step 516 to play the selected MP3 file.

At step 516, the second controller 210 decodes the selected MP3 file stored in the second memory 230 through the decoder/encoder 240, and converts a digital signal of the decoded MP3 file into an analog signal through the converter 250. The second controller 210 outputs the analog signal of the MP3 file selected by the user through the earphone 300 connected with the second ear jack 260. If an external output device such as an earphone is connected with the second ear jack 260, the second controller 210 outputs the analog signal of the MP3 file through the external output device. If the earphone 300 is not connected with the second ear jack 260, the first controller 110 detects this lack of connection and outputs the analog signal of the MP3 file through the speaker of the portable terminal.

If a call occurs while the MP3 file is being output through the earphone 300, the procedure of steps 801 to 807 of FIG. 10 is performed to process the call signal. If the user inputs the menu key when the list of MP3 files stored in the first and second memories 130 and 230 is displayed on the display unit 170, the procedure of steps 517 to 524 is performed to edit, download, and transmit the MP3 files stored in the first and second memories 130 and 230.

The method of FIG. 7 will now be described in detail with reference to the embodiment shown in FIG. 6. If the plug 402 of the memory expansion pack 200 is inserted in the controller 310 of the earphone 300 connected with the portable terminal, the first controller 110 detects this insertion at step 501, and proceeds to step 504 to switch to MP3 mode. If the user of the portable terminal 100 selects an MP3 control key item "playback" of an MP3 file stored in the second memory 230 in the memory expansion pack 200 in the procedure of steps 505 to 508, and steps 513 and 514, the first controller 110 detects this selection at step 515, and proceeds to step 516 to play the selected MP3 file.

At step 516, the first controller 110 converts a digital signal of the selected MP3 file stored in the first memory 130 into an analog signal through the decoder/encoder 140 and the converter 150, and transmits the analog signal to the memory expansion pack 200 through the plug 402 inserted in the first ear jack 160. When receiving the analog signal of the MP3 file selected by the user, the second controller 210 outputs the analog signal of the MP3 file through the earphone 300.

If a call occurs while the MP3 file is being output through the earphone 300, the second controller 210 performs the procedure of steps 801 to 807 of FIG. 10 to process the call signal. If the user inputs the menu key when the list of MP3 files stored in the first and second memories 130 and 230 is displayed on the display unit 170, the procedure of steps 517 to 524 is performed to edit, download, and transmit the MP3 files stored in the first and second memories 130 and 230.

In addition, if the user selects FM reception mode in the portable terminal 100, the first controller 110 detects this selection, and switches the portable terminal 100 to FM reception mode.

In FM reception mode, the memory expansion pack 200 receives audio data from an external device through the FM receiver 280, and transmits the received audio data to the portable terminal 100. The first controller 110 in the portable terminal 100 converts the audio data into an analog signal through the converter 150, and outputs the analog signal to the memory expansion pack 200.

The second controller 210 in the memory expansion pack 200 outputs the analog signal of the received audio data to the earphone 300 connected with the second ear jack 260.

If the user requests storage of the audio data being received through the FM receiver 280, the first controller 110 detects this request, and converts the received audio data into a digital audio signal through the converter 150 in the portable terminal 100. The first controller 110 encodes the digital audio signal through the decoder/encoder 140, and stores the encoded audio signal in the first memory 130 or in the second memory 230.

If the user requests voice recording in the portable terminal 100, the first controller 110 detects this request, and switches the portable terminal 100 to recording mode.

If the user inputs voice through a microphone (not shown) provided in the earphone 300 or a microphone (not shown) in the portable terminal 100, the first controller 110 converts an analog signal of the input voice into a digital audio signal through the converter 150 in the portable terminal 100. The first controller 110 encodes the digital audio signal through the decoder/encoder 140, and stores the encoded signal in the first memory 130 or the second memory 230.

Figure 8:
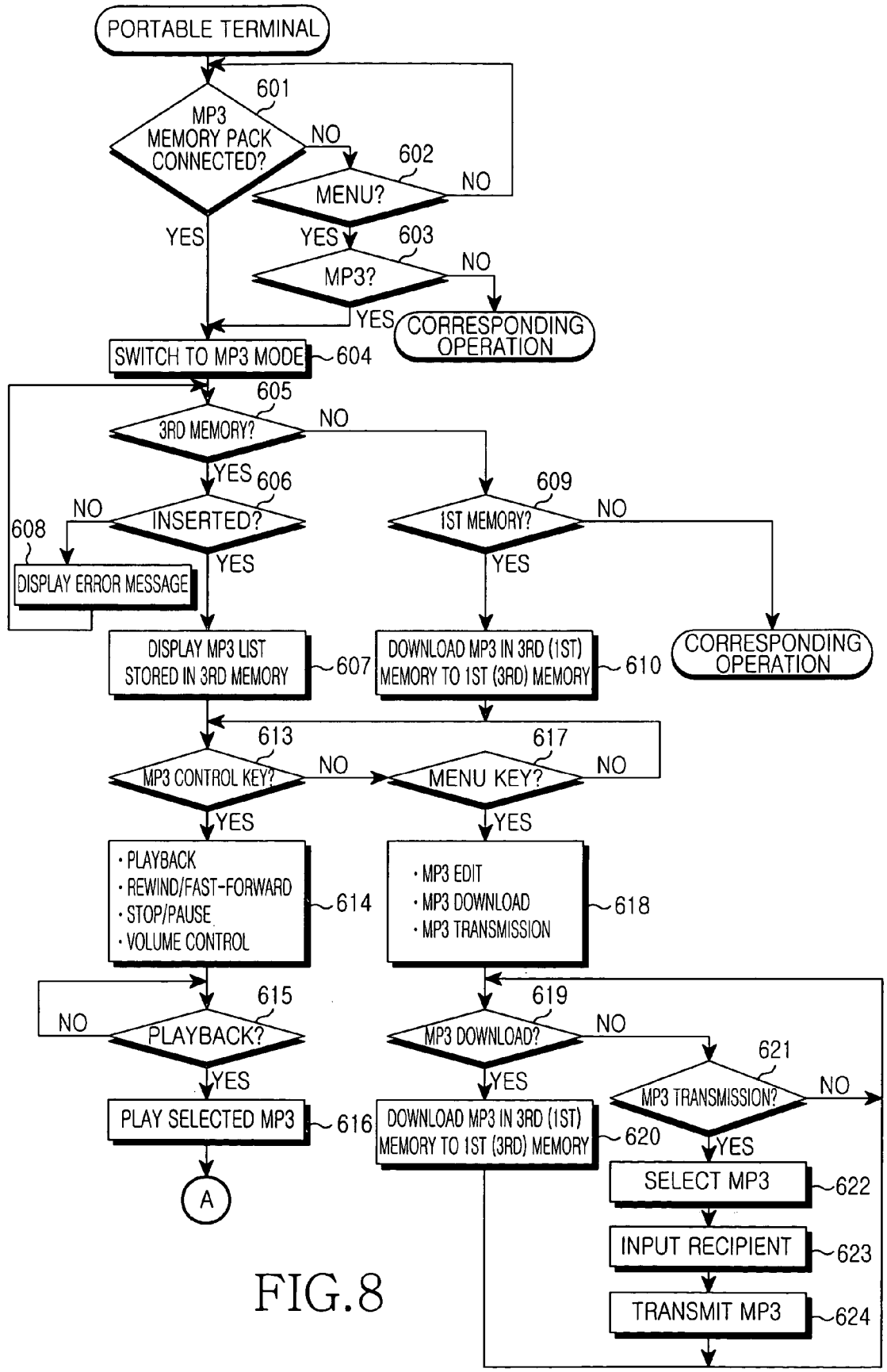
FIG. 8 is a flow chart illustrating a method for providing MP3 content from a memory expansion pack, including a detachable memory, to a portable terminal connected with the expansion pack, according to another embodiment of the present invention.

FIG. 8 is a flow chart illustrating a method for providing MP3 content from a memory expansion pack including a detachable memory, to a portable terminal connected with the expansion pack, according to another embodiment of the present invention.

The method of FIG. 8 is described in detail with reference to FIG. 3. If a connector (for example, the connection line 401) of the memory expansion pack 200 is inserted in the first ear jack 160 of the portable terminal 100, the first controller 110 detects this insertion at step 601, and proceeds to step 604 to switch to MP3 mode. Alternatively, if the user selects a menu in the portable terminal 100, the first controller 110 detects this selection at step 602, and displays menu items. If the user selects an MP3 menu item from the displayed menu items, the first controller 110 detects this selection at step 603, and proceeds to step 604 to switch the portable terminal 100 to MP3 mode.

If the user selects the third memory 250 in MP3 mode, the first controller 110 detects this selection at step 605, and controls the second controller 210 to determine whether or not the third memory 250 is inserted in the socket 255. If the third memory 250 is not inserted in the socket 255, the first controller 110 detects the non-insertion at step 606, and then proceeds to step 608 to display an error message on the display unit 170. However, if the third memory 250 is inserted in the socket 255, the first controller 110 detects this insertion at step 606, and then controls the second controller 210 to read MP3 files stored in the third memory 250 and display a list of the MP3 files on the display unit 170 at step 607. If the user selects the MP3 control key with MP3 files in the third memory 250 displayed on the display unit 170, the first controller 110 detects this selection at step 613, and proceeds to step 614 to display control key items for the MP3 files on the display unit 170.

If the user selects playback of an MP3 file from the displayed MP3 file list at step 614, the first controller 110 detects this selection at step 615, and proceeds to step 616 to play the selected MP3 file.

At step 616, under the control of the first controller 110, the second controller 210 transmits a digital signal of the selected MP3 file stored in the third memory 250 to the first controller 110 through the first ear jack 160 in which the connection line 401 is inserted. When receiving the digital signal of the MP3 file from the second controller 210, the first controller 110 transmits the received digital signal of the MP3 file to the decoder/encoder 140.

The decoder/encoder 140 decodes the MP3 file and transmits the decoded MP3 file to the converter 150. The converter 150 converts a digital signal of the decoded MP3 file into an analog signal, and transmits the analog signal to the memory expansion pack 200 through the connection line 401 inserted in the first ear jack 160.

When receiving the analog signal of the MP3 file selected by the user from the converter 150, the second controller 210 outputs the analog signal of the MP3 file through the earphone 300 connected with the second ear jack 260 at step 616. If the earphone 300 is not connected with the second ear jack 260, the first controller 110 detects this lack of connection, and allows the speaker of the portable terminal to output the analog signal of the MP3 file.

If a call occurs while the MP3 file is being output through the earphone 300, the first controller 110 detects the call occurrence at step 801, and proceeds to step 802 as shown in FIG. 10. The first controller 110 temporarily stops (i.e., pauses) the MP3 file from being output to the memory expansion pack 200 at step 802, and controls the second controller 210 to inform the user of the call occurrence at step 803 through the earphone 300.

If the user recognizes the call occurrence, and inputs a call start key, the first controller 110 detects this key input at step 804, and proceeds to step 805 to start the call. If the user ends the call, the first controller 110 detects the call end at step 806, and returns to step 616 of FIG. 7 to resume playback of the MP3 file. However, if the user inputs a call end key so as not to receive the call after recognizing the call occurrence, the first controller 110 detects this key input at step 807, and returns to step 616 of FIG. 7 to resume playback of the MP3 file. If an SMS message is received or an alarm sounds during the output of the MP3 file, the second controller 210 performs a control operation for temporarily stopping the output of the MP3 file under the control of the first controller 110 and resuming the output of the MP3 file after informing the user of the SMS reception or the alarm sounding.

If the user inputs a menu key when the list of MP3 files stored in the third memory 250 is displayed at step 607, the first controller 110 detects the menu key input at step 617, and proceeds to step 618 to display MP3 control menu items.

If the user selects a menu item "Mp3 edit" at step 618, the first controller 110 detects this selection, and enters MP3 edit mode in which the user can selectively add, modify and delete MP3 files in the third memory 250.

If the user selects a menu item "MP3 download" at step 618, the first controller 110 detects this selection at step 619, and proceeds to step 620 to selectively download MP3 files stored in the third memory 250 to the first memory 130 and store them in the first memory 130, or to selectively download MP3 files stored in the first memory 130 to the third memory 250 and store them in the third memory 250.

If the user selects a menu item "MP3 transmission" at step 618, the first controller 110 detects this selection at step 621, and proceeds to step 622 to allow the user to select an MP3 file to transmit from among the MP3 files stored in the third memory 250. The first controller 100 then allows the user to input a recipient number at step 623, and then proceeds to step 624 to transmit the selected MP3 file to the input recipient number.

If the user selects the first memory 130 in MP3 mode at step 604, the first controller 110 detects this selection at step 609, and reads the MP3 files stored in the first memory 130 and then displays a list of the MP3 files on the display unit 170 at step 610. If the user selects the MP3 control key with MP3 files in the first memory 130 displayed on the display unit 170, the first controller 110 detects this selection at step 613, and proceeds to step 614 to display control key items for the MP3 files on the display unit 170.

If the user selects playback of an MP3 file from the displayed MP3 file list at step 614, the first controller 110 detects this selection at step 615, and proceeds to step 616 to play the selected MP3 file. At step 616, the first controller 110 converts a digital signal of the selected MP3 file stored in the first memory 130 into an analog signal through the decoder/encoder 140 and the converter 150, and transmits the analog signal of the selected MP3 file to the memory expansion pack 200 through the connection line 401 inserted in the first ear jack 160.

When receiving the analog signal of the MP3 file selected by the user from the first controller 110, the second controller 210 outputs the analog signal of the MP3 file through the earphone 300 connected with the second ear jack 260 at step 616. If a call occurs during the output of the MP3 file, the procedure of steps 801 to 807 of FIG. 10 is performed under the control of the first controller 110. If the user inputs the menu key though key manipulation when the list of MP3 files stored in the first memory 230 is displayed at step 610, the procedure of steps 617 to 624 is performed to edit, download, and transmit the MP3 files stored in the first memory 130.

In addition, if the user selects FM reception mode in the portable terminal 100, the first controller 110 detects this selection, and switches the portable terminal 100 to FM reception mode.

In FM reception mode, the memory expansion pack 200 receives audio data from an external device through the FM receiver 280, and transmits the received audio data to the portable terminal 100. The first controller 110 in the portable terminal 100 converts the audio data into an analog signal through the converter 150, and outputs the analog signal to the memory expansion pack 200.

The second controller 210 in the memory expansion pack 200 outputs the analog signal of the received audio data to the earphone 300 connected with the second ear jack 260.

If the user requests storage of the audio data being received through the FM receiver 280, the first controller 110 detects this request, and converts the received audio data into a digital audio signal through the converter 150 in the portable terminal 100. The first controller 110 encodes the digital audio signal through the decoder/encoder 140 and stores the encoded audio signal in the first memory 130 or in the third memory 250.

If the user requests voice recording in the portable terminal 100, the first controller 110 detects this request, and switches the portable terminal 100 to recording mode.

If the user inputs voice through a microphone (not shown) provided in the earphone 300 or a microphone (not shown) in the portable terminal 100, the first controller 110 converts an analog signal of the input voice into a digital audio signal through the converter 150 in the portable terminal 100. The first controller 110 encodes the digital audio signal through the decoder/encoder 140, and stores the encoded signal in the first memory 130 or the third memory 250.

Figure 9:
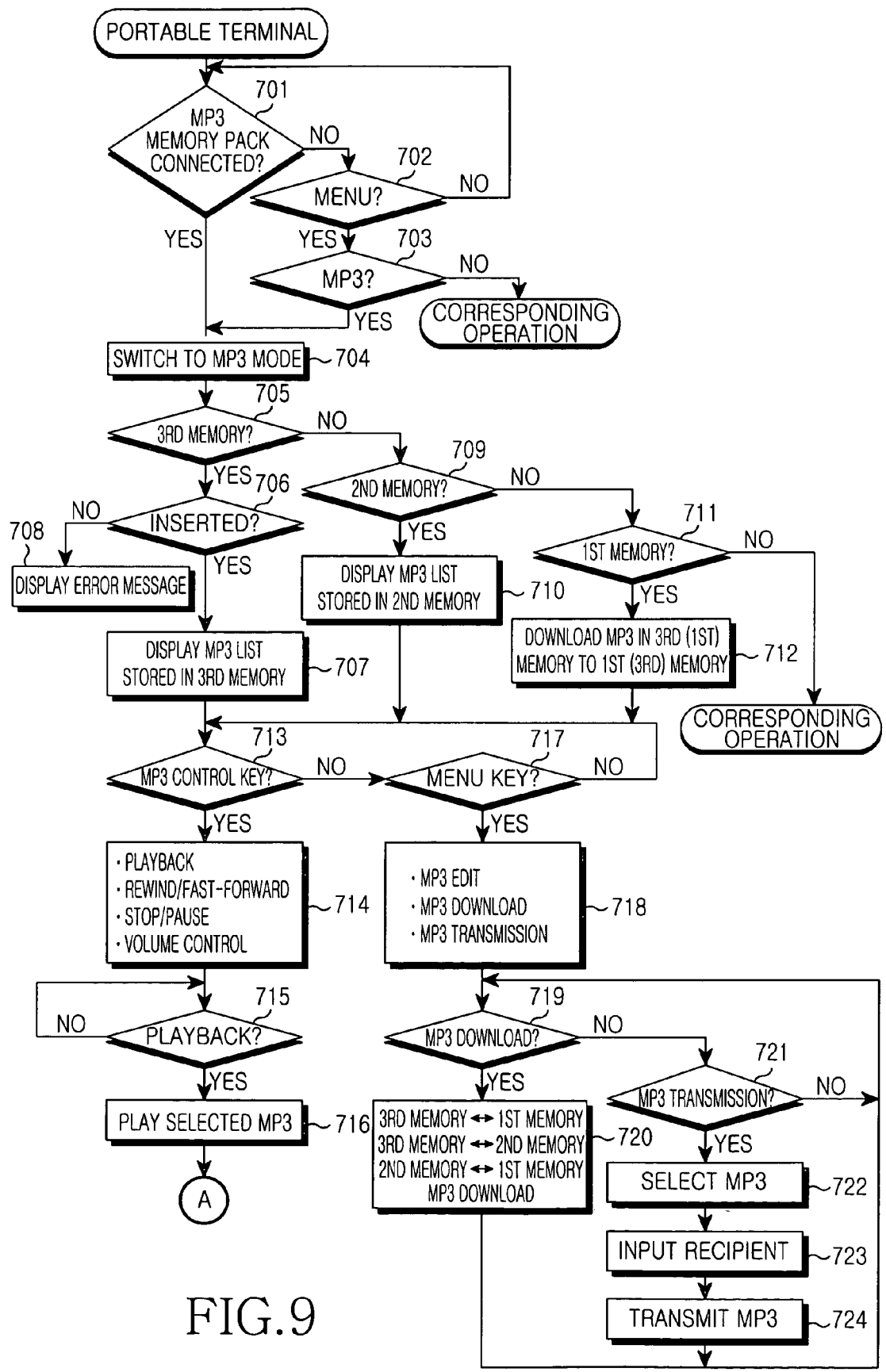
FIG. 9 is a flow chart illustrating a method for providing MP3 content from a memory expansion pack, including built-in and detachable memories, to a portable terminal connected with the expansion pack, according to yet another embodiment of the present invention.

FIG. 9 is a flow chart illustrating a method for providing MP3 content from a memory expansion pack, including built-in and detachable memories, to a portable terminal connected with the expansion pack, according to yet another embodiment of the present invention.

The method of FIG. 9 is described in detail with reference to FIG. 4. If the connection line 401 of the memory expansion pack 200 is inserted in the first ear jack 160 of the portable terminal 100, the first controller 110 detects this insertion at step 701, and proceeds to step 704 to switch the portable terminal 100 to MP3 mode. Alternatively, if the user of the portable terminal selects a menu in the portable terminal, the first controller 110 detects this selection at step 702, and displays menu items. If the user selects an MP3 menu item from the displayed menu items, the first controller 110 detects this selection at step 703, and proceeds to step 704 to switch the portable terminal 100 to MP3 mode.

In the MP3 mode of step 704, the user can select the first memory 130 in the portable terminal 100 or the second or third memories 230 or 250 in the memory expansion pack 200.

If the user selects the third memory 250 in MP3 mode, the first controller 110 detects this selection at step 705, and controls the second controller 210 to determine whether or not the third memory 250 is inserted in the socket 255.

If the third memory 250 is not inserted in the socket 255, the first controller 110 detects the non-insertion at step 706, and then proceeds to step 708 to display an error message on the display unit 170. However, if the third memory 250 is inserted in the socket 255, the first controller 110 detects this insertion at step 706, and then controls the second controller 210 to read MP3 files stored in the third memory 250 and display a list of the MP3 files on the display unit 170 at step 707.

If the user selects the second memory 230 in MP3 mode, the first controller 110 detects this selection at step 709, and controls the second controller 210 to read MP3 files stored in the second memory 230 and display a list of the MP3 files on the display unit 170 at step 710.

If the user selects the first memory 130 in MP3 mode, the first controller 110 detects this selection at step 711, and reads MP3 files stored in the first memory 130 and then displays a list of the MP3 files on the display unit 170 at step 712.

The procedure for playing the MP3 file stored in the selected memory is performed at steps 713 to 716, and the procedure for processing a call occurring during the output of the MP3 file is performed at steps 801 to 807 of FIG. 10. The procedure for editing, downloading, and transmitting the MP3 file is performed at steps 717 to 724. During this procedure, at step 720, MP3 files stored in the third memory 250 can be downloaded to and stored in the first and second memories 130 and 230, MP3 files stored in the second memory 230 can be downloaded to and stored in the first and third memories 130 and 250, and MP3 files stored in the first memory 130 can be downloaded to and stored in the second and third memories 230 and 250.

The procedure for playing the MP3 file, the procedure for processing a call occurring during the output of the MP3 file, and the procedure for editing, downloading and transmitting the MP3 file are performed in substantially the same manner as those of FIGS. 5 and 6.

In addition, if the user selects FM reception mode in the portable terminal 100, the first controller 110 detects this selection, and switches the portable terminal 100 to FM reception mode.

In FM reception mode, the memory expansion pack 200 receives audio data from an external device through the FM receiver 280, and transmits the received audio data to the portable terminal 100. The first controller 110 in the portable terminal 100 converts the audio data into an analog signal through the converter 150, and outputs the analog signal to the memory expansion pack 200.

The second controller 210 in the memory expansion pack 200 outputs the analog signal of the received audio data to the earphone 300 connected with the second ear jack 260.

If the user requests storage of the audio data being received through the FM receiver 280, the first controller 110 detects this request, and converts the received audio data into a digital audio signal through the converter 150 in the portable terminal 100. The first controller 110 encodes the digital audio signal through the decoder/encoder 140 and stores the encoded audio signal in the first memory 130, the second memory 230 or the third memory 250.

If the user requests voice recording in the portable terminal 100, the first controller 110 detects this request, and switches the portable terminal 100 to recording mode.

If the user inputs voice through a microphone (not shown) provided in the earphone 300 or a microphone (not shown) in the portable terminal 100, the first controller 110 converts an analog signal of the input voice into a digital audio signal through the converter 150 in the portable terminal 100. The first controller 110 encodes the digital audio signal through the decoder/encoder 140, and stores the encoded signal in the first memory 130, the second memory 230 or the third memory 250.

Although the above embodiments have described the MP3 control key 270 as being provided on the key input unit 127 of the portable terminal 100 to control MP3 files, the MP3 control key may be provided on the memory expansion pack 200 or the earphone 300, rather than the key input unit 127, to control MP3 files.

When the MP3 control key is provided on the memory expansion pack 200 or the earphone 300 to control MP3 files, the first controller 110 performs a control operation so that MP3 file operations are displayed on the display unit 170.

As apparent from the above descriptions, the present invention provides a memory expansion pack for storing and providing content to a portable terminal, thereby allowing the user of the portable terminal to provide and use a large amount of various content. This makes it possible to provide high quality services, overcoming the limited memory capacity of portable terminals, and also to reduce the cost of wireless data communication.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A memory expansion pack for providing content to a portable terminal, the expansion pack comprising:
   a memory for storing content;
   a controller for controlling operations of the memory expansion pack, and control both data input and output communications with both a portable terminal coupled with the memory expansion pack, and an ear jack of the memory expansion pack;
   an ear jack of the memory expansion pack for outputting the content through an external output device when the ear jack is connected with the external output device, and for downloading content from a personal computer when the ear jack is connected with the personal computer;
   an ear jack connector of the memory expansion pack for connecting the memory expansion pack with an ear jack of the portable terminal;
   at least one key disposed upon said expansion pack for allowing user control, at the expansion pack, of the operations of the memory expansion pack, comprising both data input and output communications with both the portable terminal coupled with the memory expansion pack via the ear jack connector, and the ear jack of the memory expansion pack, comprising downloading content from a personal computer when the ear jack is connected with the personal computer and outputting content with the external output device when the ear jack is connected with the external output device; and a connection line, wherein the connection line comprises a first end for connection with the ear jack connector of the memory expansion pack, and a second end for connection with the ear jack of the portable terminal, for connecting the memory expansion pack with the portable terminal.

2. The memory expansion pack according to claim 1, wherein the memory stores content downloaded from the portable terminal and the personal computer, the memory being at least one of a detachable memory and a built-in memory.

3. The memory expansion pack according to claim 1, further comprising:
   an FM (Frequency Modulation) receiver for receiving audio data from an external device over a set frequency channel.

4. The memory expansion pack according to claim 3, wherein the content is at least one of MP3 file data, recorded voice data, and audio data received through the FM receiver.

5. The memory expansion pack according to claim 1, further comprising:
   a decoder/encoder for decoding data stored in the memory, and encoding data output from a converter; and
   the converter for converting an analog signal of input data into a digital signal, and for converting a digital signal of data output from the decoder/encoder into an analog signal.

6. The memory expansion pack according to claim 1, wherein the external output device is at least one of an earphone and an external speaker.

7. The memory expansion pack according to claim 1, further comprising:
   keys for controlling MP3 files; and
   a second memory for storing content, which is a detachable memory.

8. The memory expansion pack according to claim 1, wherein the connector is at least one of a connection line and a plug.

9. The memory expansion pack according to claim wherein the connector is connected with an external output device and the external output device is connected with the portable terminal.

* * * * *